US012759185B2

(12) United States Patent
Hall

(10) Patent No.: US 12,759,185 B2
(45) Date of Patent: Oct. 13, 2026

(54) ROUTER GUIDE JIG FOR HINGE AND STRIKE PLATE INSTALLATION

(71) Applicant: Taylor James Hall, Palatine, IL (US)

(72) Inventor: Taylor James Hall, Palatine, IL (US)

(73) Assignee: BAM IP Holding LLC, Saint Charles, IL (US)

( * ) Notice: Subject to any disclaimer, the term of this patent is extended or adjusted under 35 U.S.C. 154(b) by 452 days.

(21) Appl. No.: 18/351,639

(22) Filed: Jul. 13, 2023

(65) Prior Publication Data

US 2024/0066746 A1 Feb. 29, 2024

Related U.S. Application Data

(60) Provisional application No. 63/402,251, filed on Aug. 30, 2022.

(51) Int. Cl.
*B27F 5/12* (2006.01)
*B27C 5/10* (2006.01)

(52) U.S. Cl.
CPC . *B27F 5/12* (2013.01); *B27C 5/10* (2013.01)

(58) Field of Classification Search
CPC .................................... B27F 5/12; B27C 5/10
(Continued)

(56) References Cited

U.S. PATENT DOCUMENTS 464,867 A 12/1891 Harris
527,600 A * 10/1894 Etherington ........ E05D 11/0009 33/197

(Continued)

FOREIGN PATENT DOCUMENTS

EP 1840308 A2 10/2007
GB 2285410 A 7/1995

(Continued)

OTHER PUBLICATIONS

JustDoorToolz HMS1 3-1/2-RAD-3 Hinge Mortising System—3/12“ with 5/8” Radius—https://absupply.net/justdoortoolz-hms 1-3-12-rad-hinge-mortising-system-3-12-with-58-radius.aspx (Year: 2023).*

(Continued)

*Primary Examiner* — Jason L Vaughan

(74) *Attorney, Agent, or Firm* — Reinhart Boerner Van Deuren P.C.

(57) ABSTRACT

A router guide jig includes a frame assembly that includes a first leg, a second leg, and a support member. The support member has an opening extending through the support member positioned at least in part offset from the first leg. The receiving opening defines a first axis. The router guide jig includes at least one backset member carried by the first leg having a first abutment surface facing away from the first leg. The at least one backset member is positionable in at least a first position and in a second position relative to the first leg. In the first position, the first abutment surface is spaced a first distance from the first leg. In a second position, the first abutment surface is spaced a second distance from the first leg. The router guide jig includes at least one clamp member carried by the second leg having a second abutment surface facing away from the second leg. The at least one clamp member is adjustable relative to the second leg to adjust a clamping force provided by the at least one clamp member.

19 Claims, 19 Drawing Sheets

(58) Field of Classification Search
USPC .......................... 33/197, 194; 144/144.51, 27
See application file for complete search history.

(56) References Cited

U.S. PATENT DOCUMENTS

| | | | | | |
|---|---|---|---|---|---|
| 1,005,336 | A | | 10/1911 | Sherwood | |
| 1,050,155 | A | | 1/1913 | Mason | |
| 1,326,583 | A | | 12/1919 | Catalanotto | |
| 1,524,234 | A | | 1/1925 | Carter | |
| 1,644,666 | A | | 10/1927 | Carter | |
| 1,679,074 | A | * | 7/1928 | Carter | B27F 5/12<br>144/144.1 |
| 1,733,775 | A | * | 10/1929 | Chalmers | E05B 17/06<br>33/197 |
| 1,788,256 | A | | 1/1931 | Sherwin | |
| 2,355,603 | A | | 8/1944 | Zern | |
| 2,427,081 | A | | 9/1947 | Zern | |
| 2,605,790 | A | | 8/1952 | Schwarzer | |
| 2,629,937 | A | | 2/1953 | Tubbs | |
| 2,637,910 | A | | 5/1953 | Buttram | |
| 2,655,732 | A | | 10/1953 | Morgan | |
| 2,659,159 | A | | 11/1953 | Jarrett et al. | |
| 2,660,803 | A | | 12/1953 | Sacrey | |
| 2,670,546 | A | | 3/1954 | Godfrey | |
| 2,709,855 | A | | 6/1955 | Graham | |
| 2,789,359 | A | | 4/1957 | Adolphson | |
| 2,801,655 | A | | 8/1957 | Zern | |
| 2,804,106 | A | | 8/1957 | Manno | |
| 2,821,028 | A | | 1/1958 | Godfrey | |
| 2,854,761 | A | | 10/1958 | Graham | |
| 2,869,245 | A | | 1/1959 | Bork | |
| 2,894,333 | A | | 7/1959 | Zern | |
| 2,927,378 | A | | 3/1960 | Godfrey et al. | |
| 3,035,618 | A | * | 5/1962 | Menke | B27F 5/12<br>144/27 |
| 3,062,075 | A | | 11/1962 | Saha | |
| 3,150,452 | A | | 9/1964 | Meuwissen | |
| 3,184,859 | A | | 5/1965 | Patrick | |
| 3,206,861 | A | | 9/1965 | Damijonaitis et al. | |
| 3,407,853 | A | | 10/1968 | Bailey | |
| 3,519,043 | A | | 7/1970 | Guill | |
| 3,559,704 | A | | 2/1971 | Thompson | |
| 3,700,344 | A | * | 10/1972 | Grumbach | B27F 5/12<br>144/70 |
| 3,738,013 | A | | 6/1973 | Gregory | |
| 4,058,902 | A | | 11/1977 | Hall | |
| 4,215,731 | A | | 8/1980 | Maynard | |
| 4,235,268 | A | * | 11/1980 | Savary | B25D 3/00<br>30/167 |
| 4,290,464 | A | | 9/1981 | Marsan | |
| 4,306,823 | A | * | 12/1981 | Nashlund | B23B 47/287<br>33/197 |
| 4,392,307 | A | | 7/1983 | Wightman, Jr. | |
| 4,400,886 | A | | 8/1983 | Bindschatel | |
| 4,445,277 | A | * | 5/1984 | Keefe | B23B 47/287<br>144/144.51 |
| 4,501,308 | A | | 2/1985 | Sherman | |
| 4,586,262 | A | | 5/1986 | Back | |
| 4,715,125 | A | * | 12/1987 | Livick | E05B 17/06<br>33/197 |
| 4,813,826 | A | * | 3/1989 | Riedel | B27F 5/12<br>33/197 |
| 4,815,215 | A | * | 3/1989 | Saylor | E05B 17/06<br>33/562 |
| 4,914,822 | A | | 4/1990 | Wetherington | |
| 4,984,613 | A | | 1/1991 | Szeto et al. | |
| 5,029,394 | A | | 7/1991 | Carey | |
| 5,042,543 | A | | 8/1991 | Carey | |
| 5,052,454 | A | | 10/1991 | Meinhardt | |
| 5,067,537 | A | * | 11/1991 | Offner | B27F 5/12<br>144/144.1 |
| 5,146,961 | A | | 9/1992 | Schoeller | |
| 5,279,343 | A | | 1/1994 | Woods | |
| 5,299,609 | A | | 4/1994 | Wedler | |
| D351,775 | S | | 10/1994 | Wedler | |
| 5,433,009 | A | | 7/1995 | Keels, Jr. | |
| 5,511,312 | A | | 4/1996 | Hobbs | |
| 5,524,684 | A | | 6/1996 | Stuckel | |
| D395,246 | S | | 6/1998 | Carey | |
| 5,762,115 | A | | 6/1998 | Shouse | |
| 5,862,848 | A | | 1/1999 | Beall | |
| D415,046 | S | | 10/1999 | Carey | |
| 6,070,626 | A | | 6/2000 | Tully | |
| 6,343,632 | B1 | * | 2/2002 | Zivojinovic | B23B 47/287<br>144/92 |
| 6,954,989 | B1 | * | 10/2005 | Morton | B23B 47/287<br>408/72 R |
| D547,680 | S | | 7/2007 | King | |
| 7,241,091 | B1 | * | 7/2007 | Yang | E05D 11/0009<br>33/562 |
| 7,752,762 | B2 | * | 7/2010 | King, IV | E05B 17/06<br>33/562 |
| 7,766,059 | B2 | * | 8/2010 | Kozina | B27F 5/12<br>33/562 |
| 7,896,042 | B2 | | 3/2011 | Kozina et al. | |
| D639,682 | S | | 6/2011 | Kozina et al. | |
| D641,267 | S | | 7/2011 | Kozina et al. | |
| 8,016,005 | B1 | * | 9/2011 | Weinstein | B27F 5/12<br>144/144.1 |
| D698,377 | S | | 1/2014 | McGaughy | |
| D894,707 | S | | 9/2020 | Hall | |
| D913,347 | S | | 3/2021 | Hall | |
| D933,441 | S | | 10/2021 | Metcalfe | |
| D1,003,141 | S | * | 10/2023 | Liu | D8/71 |
| D1,008,770 | S | | 12/2023 | Urig | |
| 12,251,850 | B2 | * | 3/2025 | Liu | B27F 5/02 |
| 2006/0032553 | A1 | | 2/2006 | Williams | |
| 2007/0283528 | A1 | | 12/2007 | McDaniel et al. | |
| 2008/0000395 | A1 | | 1/2008 | Radermacher | |
| 2008/0052999 | A1 | | 3/2008 | King et al. | |
| 2008/0142119 | A1 | * | 6/2008 | Ponce | B23Q 9/0042<br>144/144.51 |
| 2008/0210338 | A1 | * | 9/2008 | Ponce | B23Q 9/0042<br>144/144.51 |
| 2013/0327442 | A1 | | 12/2013 | Cardew | |
| 2018/0186028 | A1 | | 7/2018 | Ponce | |
| 2019/0039192 | A1 | | 2/2019 | Smith | |
| 2021/0146491 | A1 | | 5/2021 | Browning | |
| 2022/0395950 | A1 | | 12/2022 | Urig | |
| 2023/0055340 | A1 | | 2/2023 | Walters et al. | |
| 2024/0066746 | A1 | | 2/2024 | Hall | |

FOREIGN PATENT DOCUMENTS

| | | | |
|---|---|---|---|
| GB | 2408958 | A | 6/2005 |
| GB | 2435234 | A | 8/2007 |
| GB | 2463965 | A | 4/2010 |
| GB | 2490139 | A | 10/2012 |

OTHER PUBLICATIONS https://www.amazon.com/Two-Piece-Professional-Router-Recessing-Jig/dp/B001UQ5PCG?th=1: known prior to Jul. 13, 2023 ( Year: 2023).* https://www.amazon.com/Bosch-83038-Deluxe-Hinge-Template/product-reviews/B0000224KW; known prior to Jul. 13, 2023.

Hinge Mate HM 1100W Door Hinge Template Review—Making the Cut With Quality; https://homefixated.com/hinge-mate-hm-1100w-door-hinge-template/; known prior to Jul. 13, 2023.

https://www.leevalley.com/en-us/shop/tools/power-tool-accessories/router-accessories/40219-the-original-carey-template-hinge-mortising-system?item=15J7501; known prior to Jul. 13, 2023.

https://norfield.com/den1-nail-on-universal-hinge-template.html; known prior to Jul. 13, 2023.

https://norfield.com/den2-universal-latch-template-3026.html; known prior to Jul. 13, 2023.

https://denpoproducts.com/product/full-hinge-template-kit/; known prior to Jul. 13, 2023.

Festool Owners Group Door and jamb hinge jig; https://www.festoolownersgroup.com/festool-jigs-tool-enhancements/door-and-jamb-hinge-jig/ ; known prior to Jul. 13, 2023.

(56) References Cited

OTHER PUBLICATIONS https://absupply.net/justdoortoolz-jz225-4-12-5-commercial-jig-kit-for-hinges-latches-.aspx; known prior to Jul. 13, 2023.
Useful jigs for your shop; https://www.lumberjocks.com/threads/useful-jigs-for-your-shop.326012/page-3#post-2151328; known prior to Jul. 13, 2023.
https://milescraft.com/product/hingemate300/; known prior to Jul. 13, 2023.
https://milescraft.com/product/hingemate200/; known prior to Jul. 13, 2023.
https://milescraft.com/product/hingemate350/; known prior to Jul. 13, 2023.
https://milescraft.com/product/hingemate150/; known prior to Jul. 13, 2023.
https://www.walmart.com/ip/Milescraft-1293-Interior-Door-Mortising-Kit-for-1-3-8-Inch-Doors-and-Jambs/383660186; known prior to Jul. 13, 2023.
https://www.milwaukeetool.com/Products/49-54-0101; known prior to Jul. 13, 2023.
https://norfield.com/mfg56100-hingemaster-kit.html; known prior to Jul. 13, 2023.
https://norfield.com/dor4001-doortech-rts-4-door-edge-template-fixture.html; known prior to Jul. 13, 2023.
https://norfield.com/dor33400-4-hinge-templates-4-template-set.html; known prior to Jul. 13, 2023.
https://www.amazon.com/PORTER-CABLE-59370-Door-Hinge-Template/dp/B00004TI3O; known prior to Jul. 13, 2023.
https://www.amazon.com/PORTER-CABLE-59381-Hinge-Butt-Template/dp/B0000224KV?th=1; known prior to Jul. 13, 2023.
https://www.ptreeusa.com/rtr_jigs_hinge.htm; known prior to Jul. 13, 2023.
https://www.routingjigs.co.uk/product/lock-jig/; known prior to Jul. 13, 2023.
https://www.routingjigs.co.uk/product/compact-hinge-jig-ploycarbonate/; known prior to Jul. 13, 2023.
https://www.routingjigs.co.uk/product/compact-hinge-jig-with-clamping-plate/; known prior to Jul. 13, 2023.
https://www.amazon.com/Ryobi-A99HT2-Installation-Mortiser-Template/dp/B00C6MBKN6; known prior to Jul. 13, 2023.
https://sydneytools.com.au/product/xtorque-xdh001-aluminum-easyhinge-jig; known prior to Jul. 13, 2023.
https://www.templaco.com/html/product.asp?id=32&mode=Single+Pocket; known prior to Jul. 13, 2023.
https://www.amazon.com/Templaco-MS-400-Multi-Strike-Template-Deadbolt/dp/B00066161A/ref=sr_1_1?crid=1JIYGSXUOYHP8&keywords=templaco+ms-400&qid=1695309493&sprefix=templaco+ms-400%2Caps%2C136&sr=8-1; known prior to Jul. 13, 2023.
https://www.amazon.com/Two-Piece-Professional-Router-Recessing-JIG/dp/B001UQ5PCG?th=1; known prior to Jul. 13, 2023.
https://bigamart.com/product/trend-h-c-2-piece-hinge-jig-skeleton-in-case-black/?gad=1&gclid=Cj0KCQjw06-oBhC6ARIsAGuzdw0gpUheZT-sx6ZtbM9P349ci5A4Y4A9dpKXO95hkYfVn8B8_qLr1rMaAtWCEALw_wcB; known prior to Jul. 13, 2023.
https://www.trend-usa.com/u-h-jig-8ft-hinge-jig-8-foot-3-piece-in-case; known prior to Jul. 13, 2023.
https://www.axminstertools.com/us/ujk-technology-hinge-jig-with-clamp-plate-101504; known prior to Jul. 13, 2023.
https://worktopjigs.com/jig/compact-lock-jig/; known prior to Jul. 13, 2023.
https://www.virutextools.com/router-for-fitting-hinges-fr129vb-pid317; known prior to Jul. 13, 2023.
https://www.virutextools.com/special-template-for-concealed-hinges-pid489; known prior to Jul. 13, 2023.
https://www.woodcraft.com/products/hinge-mate-ii; known prior to Jul. 13, 2023.
https://woodhaven.com/products/woodhaven-8660-for-soss-100-hinge?variant=11924596868&currency=USD&utm_medium=product_sync&utm_source=google&utm_content=sag_organic&utm_campaign=sag_organic&srsltid=AfmBOooIncMrpXGbc3NzGkMPil7lif2lJskm8PKfWV1X-zxArjNU_Frw8Nk; known prior to Jul. 13, 2023.
"Worktop Express" Product photograph and description known prior to Jul. 13, 2023.
"Makita P-64222" Product photograph and description known prior to Jul. 13, 2023.
"Carey 100-1A" Product photograph and description known prior to Jul. 13, 2023.
Amazon, Milescraft 1226 Hinge Jig—Self Clamping Door Hinge Jig, Door Hinge Mortiser. Hinge Templates Rout Mortises from 2.5 "to 4.5". Hinge Installation Kit Includes Latch Templates for All Standard Doors, Jan. 19, 2025, https://a.co/d/02CFgvjr (Year: 2025).

* cited by examiner

ROUTER GUIDE JIG FOR HINGE AND STRIKE PLATE INSTALLATION

CROSS-REFERENCE TO RELATED PATENT APPLICATIONS

This patent application claims the benefit of U.S. Provisional Patent Application No. 63/402,251, filed Aug. 30, 2022, the entire teachings and disclosure of which are incorporated herein by reference thereto.

FIELD OF THE INVENTION

This invention generally relates to router guide jigs, and more particularly to router guide jigs for use with doors and door frames.

BACKGROUND OF THE INVENTION

Many doors require hinges that mount the door to a door frame. The doors also require a latch that cooperates with a strike plate mounted on the door frame. Doors are typically manufactured in two thickness. Interior doors are typically 1⅜ inches thick while exterior doors are typically 1¾ inches thick. In order to mount the doors to their frames the door and frames are routed to form mortises for the hinges, the latch and the strike plate. Because the doors may be of varied thickness, the hinges, latch and strike plates may also come in various sizes to match the appropriate door thickness and thus require different sized mortises appropriate for the door thickness. While prior efforts have been made to provide router guide jigs that can be configured to route different sized mortises for doors and frames, such router guide jigs have proven to either be not be configurable for both the door and frame or even if configurable for either the door or frame or both, they are overly complicated or cumbersome for the user.

The invention provides a router guide jig to address the issues raised by the prior router guide jigs. These and other advantages of the invention, as well as additional inventive features, will be apparent from the description of the invention provided herein.

BRIEF SUMMARY OF THE INVENTION

In one aspect, the invention provides a router guide jig. The router guide jig includes a frame assembly that includes a first leg, a second leg, and a support member. The support member has an opening extending through the support member positioned at least in part offset from the first leg. The receiving opening defines a first axis. The router guide jig includes at least one backset member carried by the first leg having a first abutment surface facing away from the first leg. The at least one backset member is positionable in at least a first position and in a second position relative to the first leg. In the first position, the first abutment surface is spaced a first distance from the first leg. In a second position, the first abutment surface is spaced a second distance from the first leg. The router guide jig includes at least one clamp member carried by the second leg having a second abutment surface facing away from the second leg. The at least one clamp member is adjustable relative to the second leg to adjust a clamping force provided by the at least one clamp member.

In yet another aspect, the invention provides a method that includes configuring the router guide jig in the first configuration and forming a first mortice in an edge of a door. A further step includes configuring the router guide jig in the second configuration and forming a second mortice in a side of a door jamb or door frame.

In yet another aspect, the invention provides a router guide jig that includes a frame assembly. The frame assembly includes a support member having a receiving opening extending through the support member defining a first axis. The frame assembly defines a top support surface. The support member includes at least first and second mounting features being axially spaced apart. A divider is mountable to the mounting features of the frame assembly with the divider being within the receiving opening. The divider divides the receiving opening into at least a first region and a second region. The divider has a first divider mounting feature. When the first divider mounting feature of the divider is mounted to the first mounting feature, the first region has a first cross-sectional area and the second region has a second cross-sectional area. When the divider mounting feature of the divider is mounted to the second mounting feature, the first region has a third correctional area larger than the first cross-sectional area and the second region has a fourth cross-sectional area smaller than the second cross-sectional area. A template defines a template opening therethrough defining a template axis. The template is removably mountable to the top support surface with the template axis parallel to the first axis and the receiving opening in communication with template opening. The template includes first and second template mounting features that engage the first and second mounting features of the support member when the template is mounted to the support member and the divider is removed from the support member.

In yet another aspect, the invention provides a router guide jig comprising: a frame assembly. The frame assembly includes a support member having a receiving opening extending through the support member defining a first axis. The receiving opening is generally rectangular and has a first side, a second side and a third side extending perpendicular to and between the first and second sides defining a first corner with the first side and a second corner with the second side. The first corner has a radius of curvature that is smaller than a radius of curvature of the second corner.

In yet another aspect, the invention provides a method that includes the step of configuring the router guide jig in a first configuration with the backset member in the first position and forming a first mortice in an edge of a first door having a first thickness. A further sept includes configuring the router guide jig in a second configuration with the backset member in the second position and forming a second mortice in an edge of a second door having a second thickness different than the first thickness.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
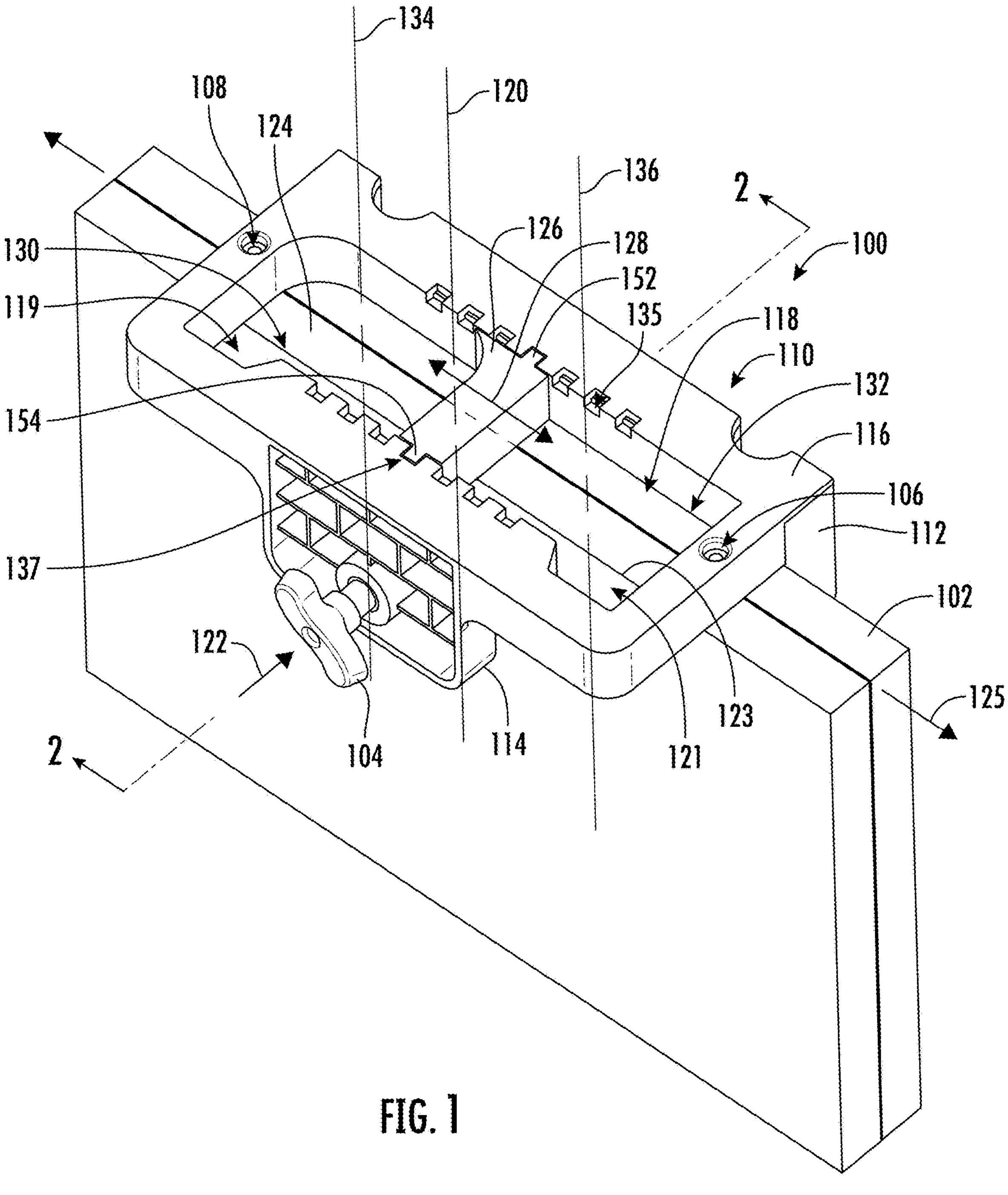
FIG. 1 is an isometric view of a first embodiment of a router guide jig clamped to a workpiece.

Turning now to the drawings, there is illustrated in FIG. 1 an embodiment of a router guide jig 100 clamped to a workpiece 102 with at least one clamp member 104 that is threaded into the router guide jig 100. The workpiece 102 may be a door or door frame and the router guide jig 100 is configurable to guide a router (not illustrated) in routing mortises for the hinges (not illustrated) and latch plates (not illustrated) for the door. Once in position on the workpiece 102 the router guide jig 100 is removably fixed in position with the at least one clamp member 104. The removable fixation may also be assisted with fasteners (not illustrated) inserted through mounting apertures 106, 108 of the router guide 100. Once the desired routing is complete, the routing guide jig 100 may be easily removed from the workpiece 102 by removing the fasteners and unclamping the clamping member 104.

The router guide jig 100 includes a frame assembly 110. The frame assembly includes a first leg 112, a second leg 114 that is a clamp leg supporting the clamp 104, and a support member 116. The support member 116 has a receiving opening 118 extending through the support member 116 positioned at least in part offset from the first leg 112. The receiving opening 118 permits a router bit of a router to be received therethrough. The receiving opening 118 may include router starter regions 119, 121 that permit the router to be inserted therein before contacting an edge 123 of the workpiece 102 that is to be routed for the desired mortise. The support member 116 provides a support surface for the router as the walls defining the receiving opening 118 act as a template guiding the router bit in routing the desired mortise in the workpiece 102.

The receiving opening 118 defines an axis 120 passing through the receiving opening 118 and extending in directions generally perpendicular to a clamping force 122 provided by the clamp member 104 and perpendicular to a work surface 124 of the workpiece 102 to be routed with the router guide jig 100. The clamping force 122 as illustrated is generally perpendicular to the axis 120 and generally perpendicular to a longitudinal axis 125 defined by the router guide jig 100. By generally it is meant within 5 degrees of perpendicular.

The router guide jig 100 includes a divider block 126 that is asymmetrical and movable in directions 128 generally parallel to the longitudinal axis 125 and generally perpendicular to the direction of the clamping force 122. The divider block 126 is movable in directions 128 to adjust the area of the receiving opening 118. The divider block 126 divides the receiving opening 118 into a radiused portion 130 and a square corner portion 132 for routing the work surface 124 to receive a hinge plate (not illustrated) and/or a latch plate (not illustrated) as desired. The radiused portions 130 and the square corner portion 132 each define a central axis 134, 136 respectively. Mounting ears 152, 154 at ends of the divider block 126 may be lifted out of a plurality of recesses 135, 137 located in opposite side walls of the receiving opening 118 in the support member 116. The mounting ears 152, 154 of the ends of the divider block 126 may then be placed back into different ones of the plurality recesses 135, 137 and thereby change the areas of the radiused portion 130 and the square corner portion as needed for the desired hinge or latch plate.

The divider block 126 is removably received in at least one of the plurality of mounting recesses 135, 137 in the support member 116 that provide for the predetermined desired area of the radiused portion 130 and the square portion 132. Moving the divider block 126 from one mounting recess 137 to another mounting recess changes the area of the radiused portion 130 and the square portion 132. The divider block 126 is removable to allow for a template 194 (FIG. 8) to be received into the receiver opening 118.

The first leg 112 and the second leg 114 are mounted to the support member 116 such that the receiving opening 118 is positioned, at least in part, between the first leg 112 and the second leg 114.

Figure 2:
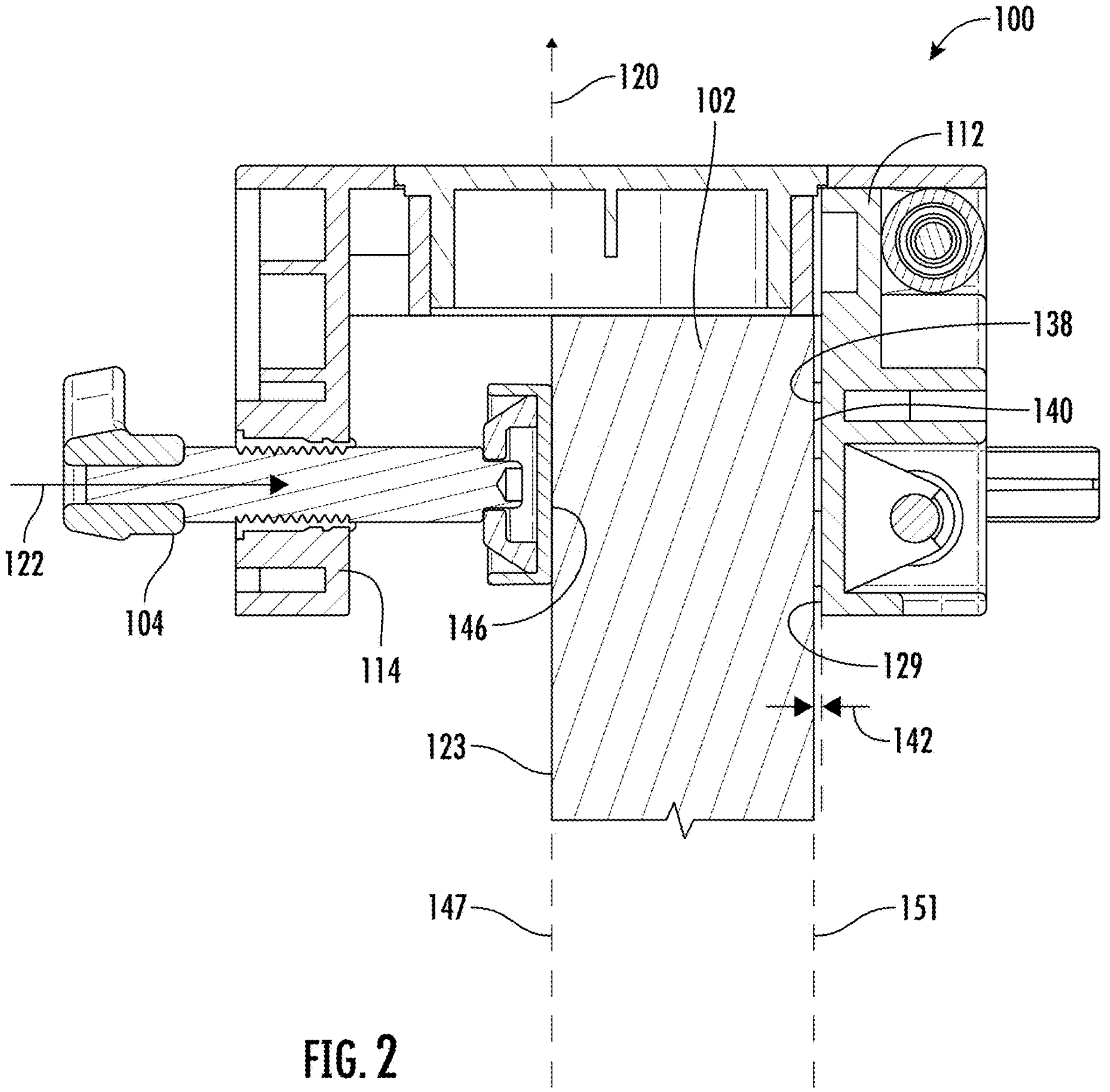
FIG. 2 is a vertical cross section or the router guide jig of FIG. 1.

The cross section shown in FIG. 2 of the router guide jig 100 illustrates the router guide jig 100 includes a backset member 138 that may be a backset pin carried by the first leg 112. Another backset member 139 (FIG. 3) may also be provided that is structurally similar to the backset member 138 and which is spaced apart from the backset member 138.

The backset member 138 has an abutment surface 140 facing away from the first leg 112. The abutment surface 140 defines an abutment plane 151 located a distance away from an inside face 129 of the first leg 112. The backset member 138 is positionable in a first position 141 (FIGS. 4 and 5A) and in a second position 143 (FIG. 6A) relative to the inside face 129 of the first leg 112. In the first position 141 the abutment surface 140 is spaced a first distance 142 (see also FIG. 5B) from the inside face 129 of the first leg 112. In the second position 143 (FIG. 6B), the abutment surface 140 is spaced a second distance 144 from the inside face 129 of the first leg 112.

While the distance 144 from the first leg is discussed, as readily understood, the desired alignment for the router guide jig 100 is based on the positioning of the receiving opening 118 relative to an edge 123 of the workpiece 102 that is to be routed. While the distance 144 from the first leg 112 is discussed so to describe the adjustability to the backset member 138, the purpose of the backset member 138 is to provide the necessary abutment surface 140 to position the receiving opening 118 relative to the edge 123. It is the cooperation between the clamp 114 and the backset member 138 that provides for the necessary adjustments to correctly position the receiving opening 118 on the workpiece 102.

Still with respect to FIG. 2, the clamp member 104 is carried by the second leg 114. The clamp member 104 has an abutment surface 146 facing away from the second leg 114. The abutment surface 146 defines an abutment plane 147. The clamp member 104 is adjustable relative to the second leg 114 to adjust the clamping force 122 provided by the clamp member 104.

Figure 3:
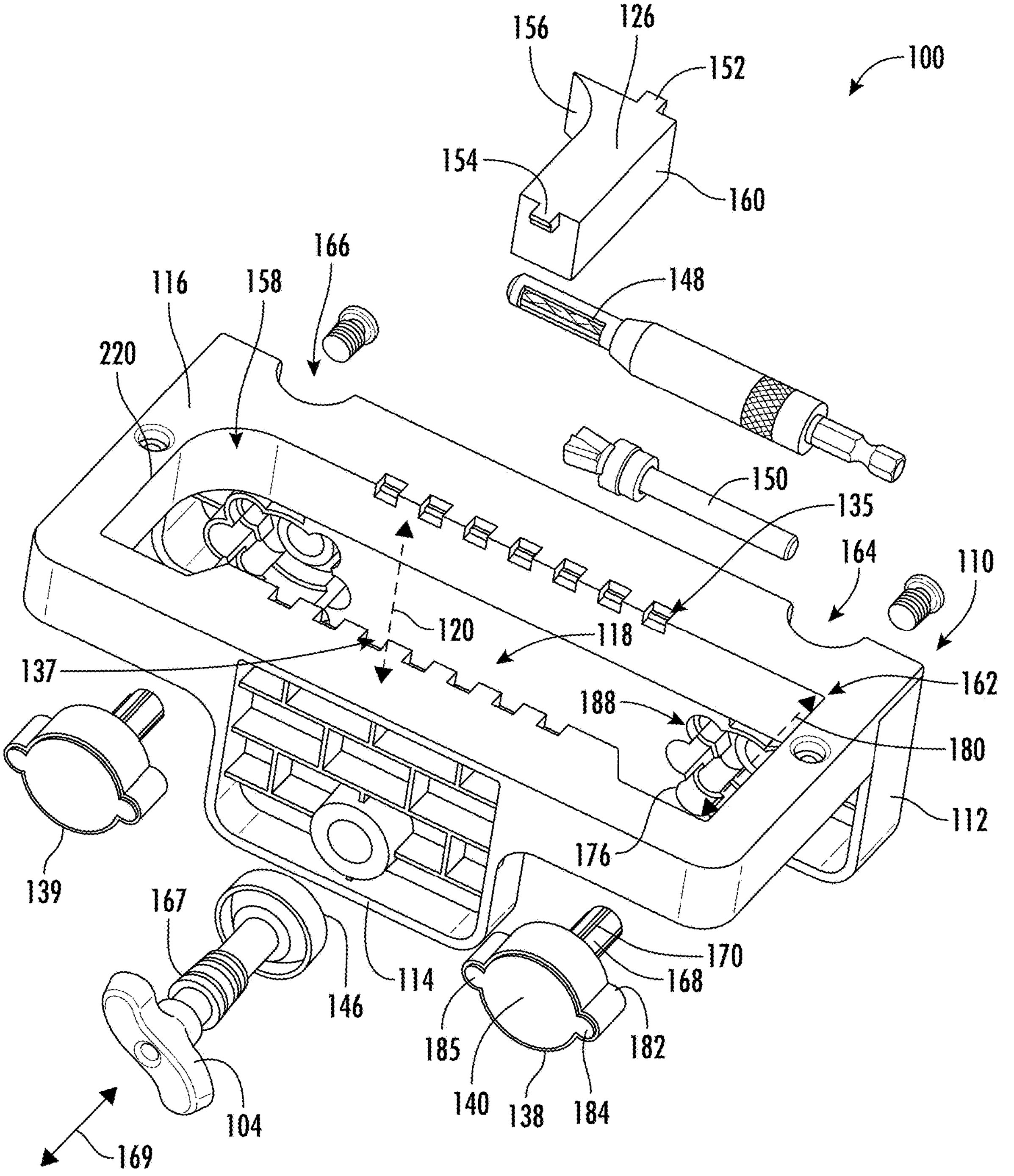
FIG. 3 is an exploded view of the router guide jig of FIG. 1.
Figure 4:
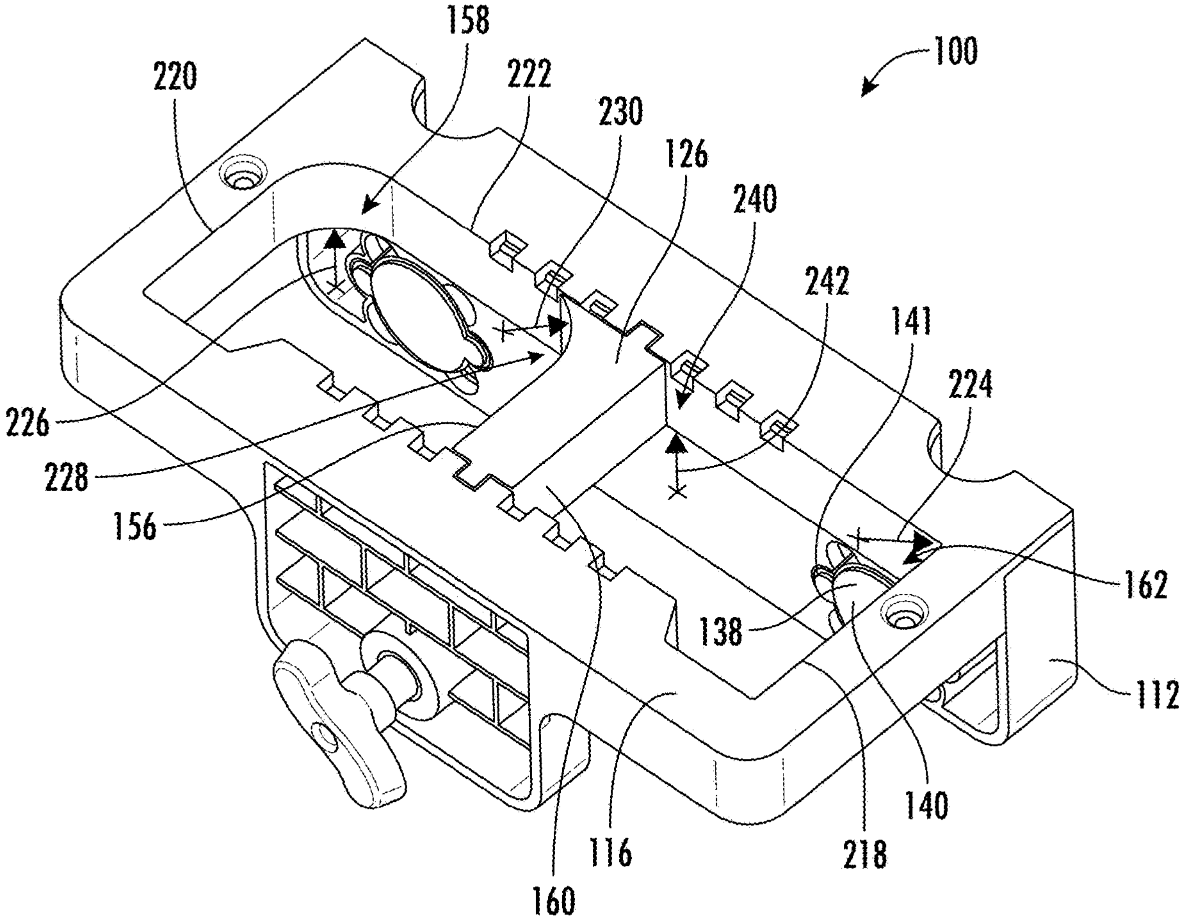
FIG. 4 illustrates the router guide jig of FIG. 1 without the workpiece.

Turning to FIGS. 3 and 4, FIG. 3 shows an exploded view of the router guide jig 100 while FIG. 4 shows the router guide jig 100 in its assembled state without a workpiece 102 (FIG. 1) to further illustrate the backset member 138 which is shown in its first position 141. The router guide jig 100 includes a drill bit 148 that may be snap fit into the router guide jig 100, for example on the first leg 112 of the frame assembly 110. The drill bit 148 may have a preset depth for drilling the holes in the workpiece 102 (FIG. 1) that will receive the fasteners for mounting the hinges and/or latch. The first leg 112 may also mount a router bit 150 for routing the mortises in the workpiece 102 (FIG. 1).

The divider block 126 includes mounting ears 152, 154 which are protrusions in stepped profile so as to be received and seated in the mounting recesses 135,137. The divider block 126 includes a radiused side 156 that when mounted in the support member 116 faces a radiused corner 158 of the receiving opening 118. A side 160 of the divider block 126 that is opposite the radiused side 156 is a square side that faces a square corner 162 of the receiving opening 118.

As seen in FIG. 4, the receiving opening 118 is generally rectangular. The receiving opening 118 has a first side 218, a second side 220 and a third side 222 extending generally perpendicular to and between the first side 218 and second side 220. A first corner 162 is defined between the first side 218 the second side 222. The radiused corner 158 is a second corner defined between the second side 220 and the third side 222. The first corner 162 has a radius of curvature 224 that is smaller than a radius of curvature of the second corner 226. The first corner 162 is substantially a square corner. By substantially it is mean withing 5 degrees of square. A radiused corner 228 is defined between the radiused side 156 of the divider block 126 and the third side 222 of the receiving opening 118. The radiused corner 228 has a radius of curvature 230 equal to the radius of curvature of the second corner 226.

The square side 160 of the divider block 126 forms a fourth corner 240 with the third side 222. The fourth corner 240 being substantially a square corner having a radius of curvature 242 equal to the first radius of curvature 224. The first and second corners 162, 158 are permanently formed by the support member 116 and the radiused portion of the third corner 228 is provided by the divider block 126. The divider block 126 is adjustably positionable within the receiving opening 118 to adjust a spacing between the divider block 126 and the first side 218 and the second side 220 defining the receiving opening 118.

As seen in FIG. 3, the support member 116 and the first leg 112 define depth notches 164, 166 in outermost peripheral surfaces thereof that permit the router to be set at the proper depth for routing the workpiece 102 (FIG. 1). The router bit 150 is inserted into the depth notch 164 or 166 until the tip of the router bit 150 abuts a bottom of the depth notch 164 or 166 at which point the router is tightened around the router bit to fix the depth of the router bit 150 and thereby fix the depth the router bit 150 will drill into the workpiece 102 (FIG. 1).

The pre-determined bottom of each depth notch 164, 166 may be located at a different distance away from a top surface of the support member 116 to provide a different predetermined depth set for the router bit 150. Clamp member 104 includes a clamp leg 167 that is threaded to permit the clamp member 104 to be threadingly received in the second leg 114 to permit the clamp member 104 to be rotated to move the clamp leg 167 in directions 169 perpendicular to the axis 120 towards and away from the first leg 112 to clamp and unclamp a workpiece 102 (FIG. 1) in the router guide jig 100.

Turning to the backset members 138 and 139, each backset member 138, 139 is structurally the same and therefore, only backset member 138 will be described. Backset member 138 includes the abutment surface 140 that abuts against the workpiece 102 (FIG. 1). The backset member 138 includes an alignment pin 168 projecting away from the abutment surface 140 and received into an aperture of the first leg 112. The alignment pin 138 includes ribs 170 that cooperate with and are press fit into receiving channels of the aperture of the first leg 112 to assist in preventing undesired rotation of the backset member 138 once it is in the first position 141 (FIGS. 5A, 5B) or the second position 143 (FIG. 6A, 6B).

Figure 5A:
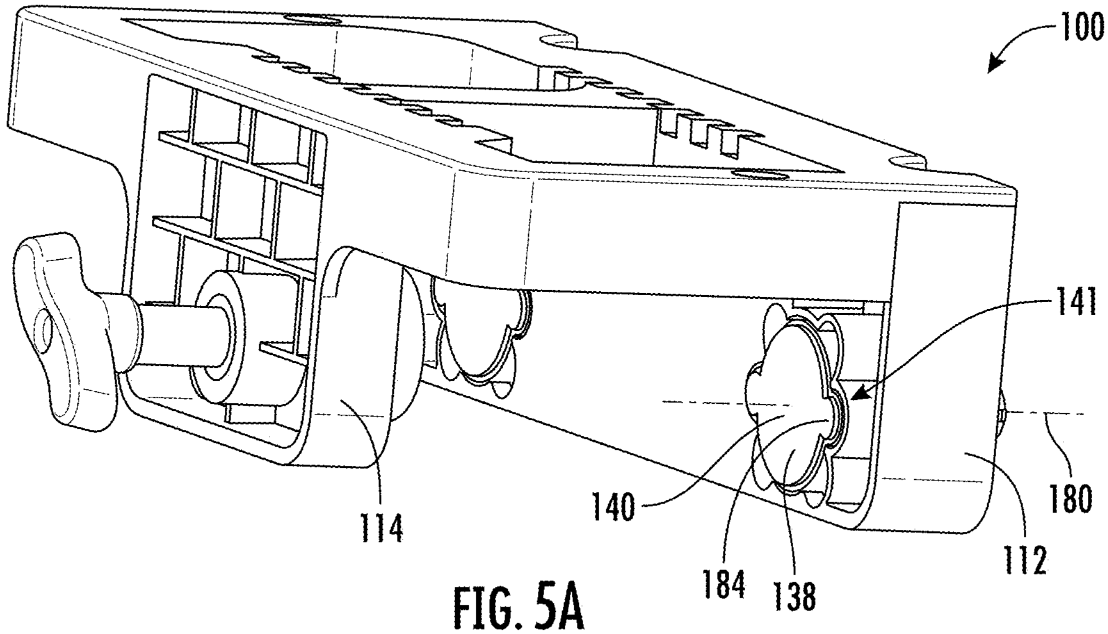
FIG. 5A illustrates another isometric view of the router guide jig of FIG. 1 with a backset in a first position and first angular orientation.
Figure 5B:
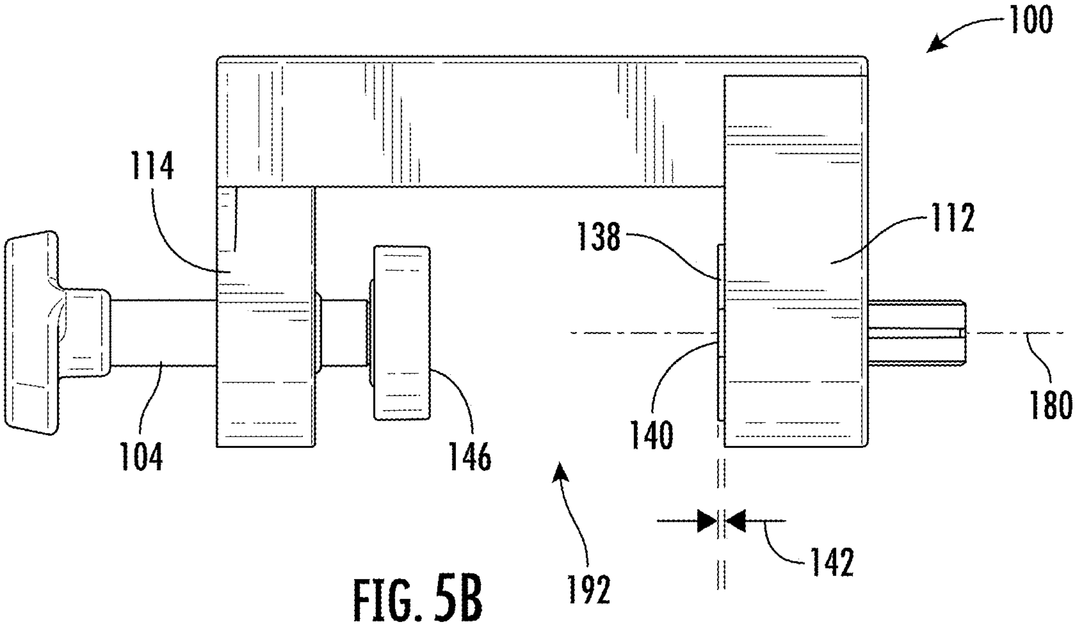
FIG. 5B is a vertical cross section of the router guide jig of FIG. 5A.
Figure 6A:
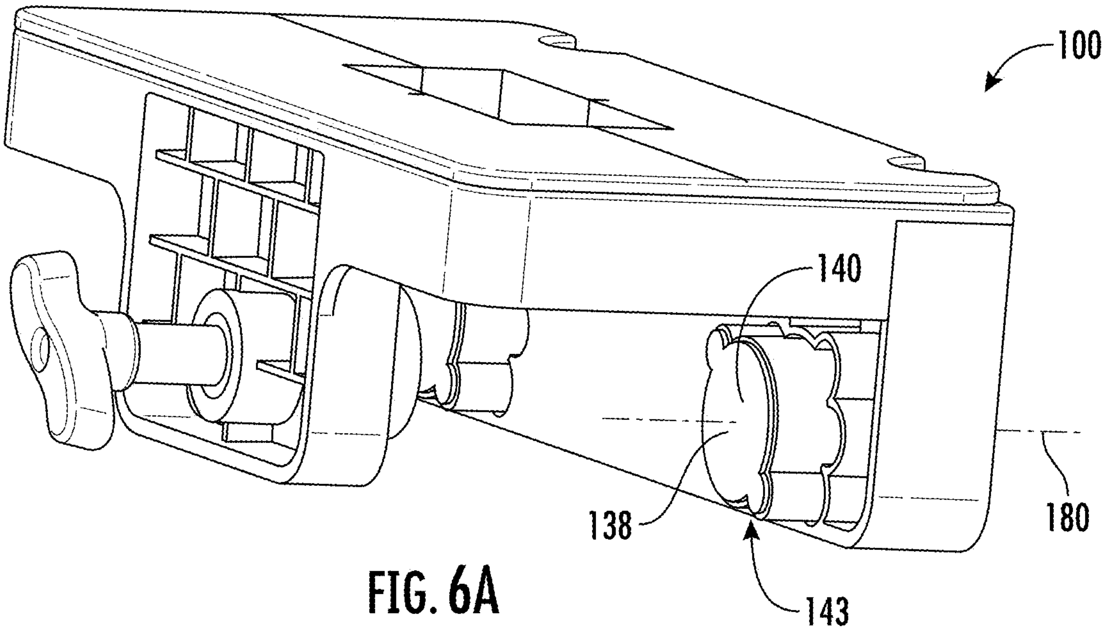
FIG. 6A is another isometric view of the router guide jig of FIG. 1 with the backset in a second position and second angular orientation.
Figure 6B:
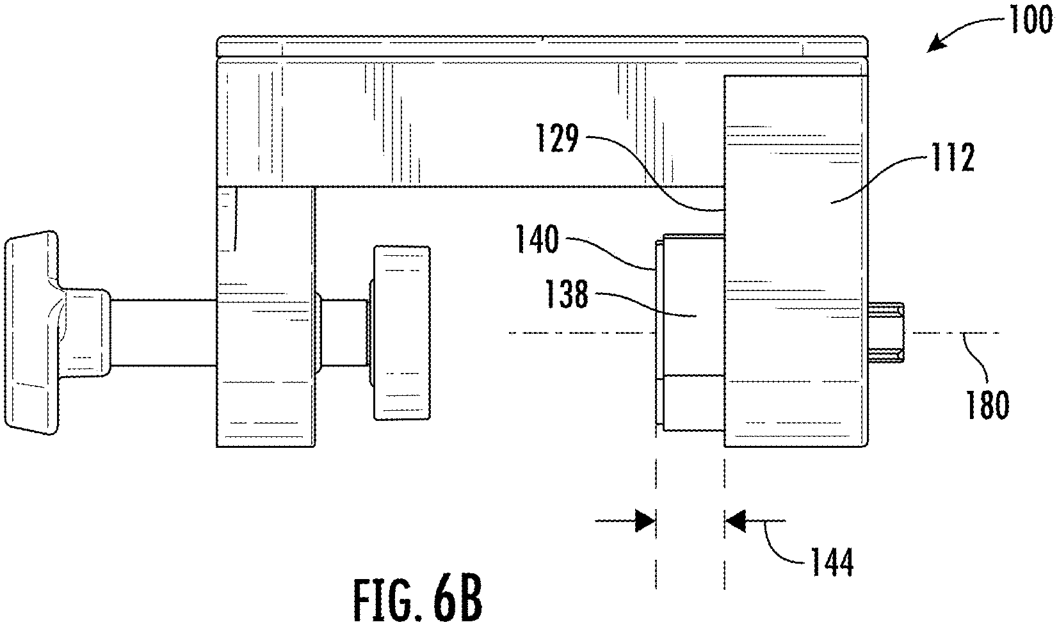
FIG. 6B is a vertical cross section of the router guide jig of FIG. 6A.
Figure 19:
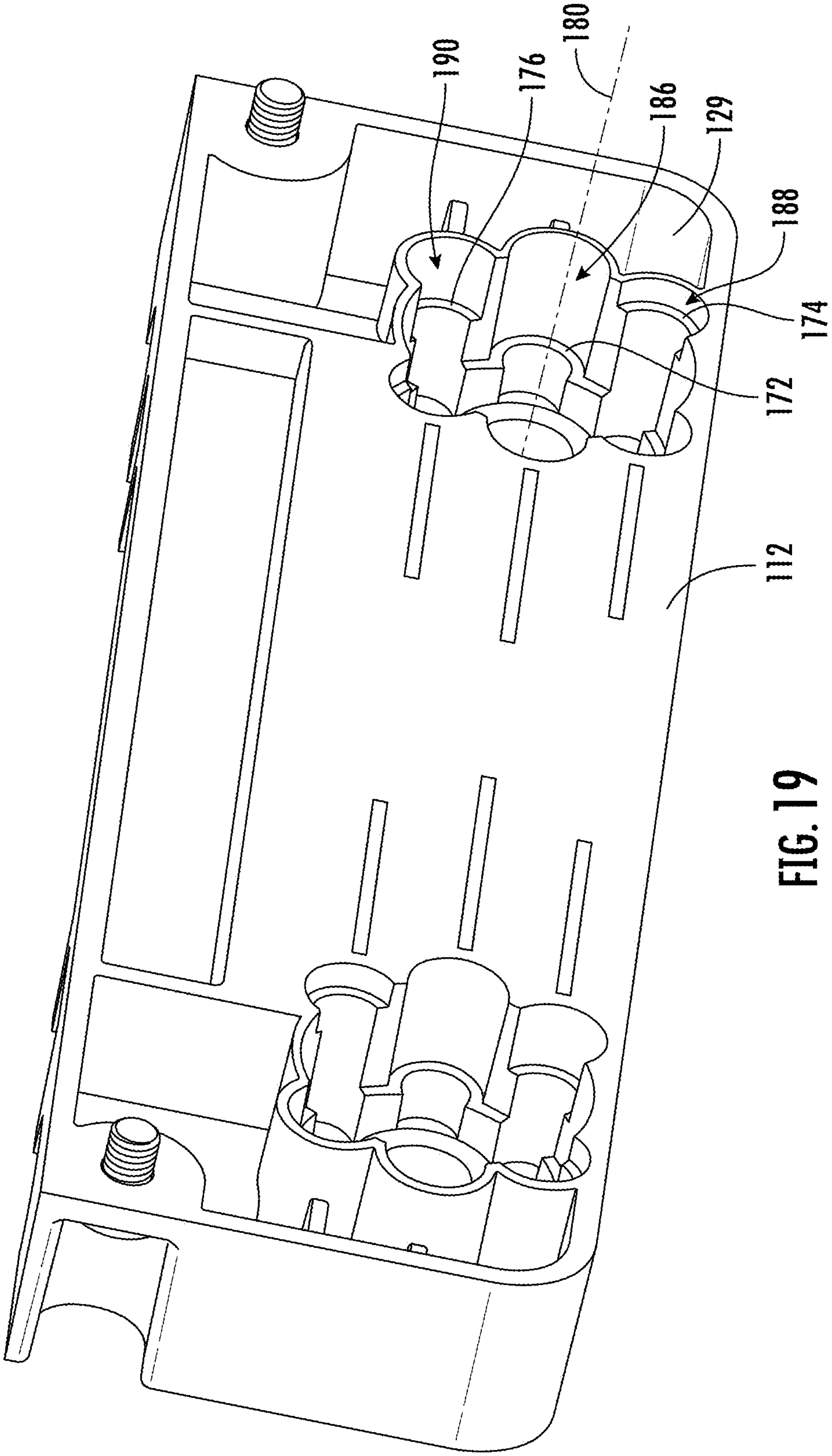
FIG. 19 illustrates backset abutment surfaces of the router guide jig of FIG. 1.

As seen in FIG. 3 and FIG. 19, the first leg 112 has a first backset positioning abutment 172 against which the back set member 138 abuts in the first position (FIG. 5A, 5B) and a second backset positioning abutment 174 against which the first back set member 138 abuts in the second position (FIG. 6A, 6B). The first and second backset positioning abutments 172, 174 are offset from one another a difference, as measured between the abutment surface 140 and the inside face 129 of the first leg 112 (see FIG. 5B), that is the distance between the first distance 142 (FIG. 5B) and second distance 144 (FIG. 6B).

Figure 7A:
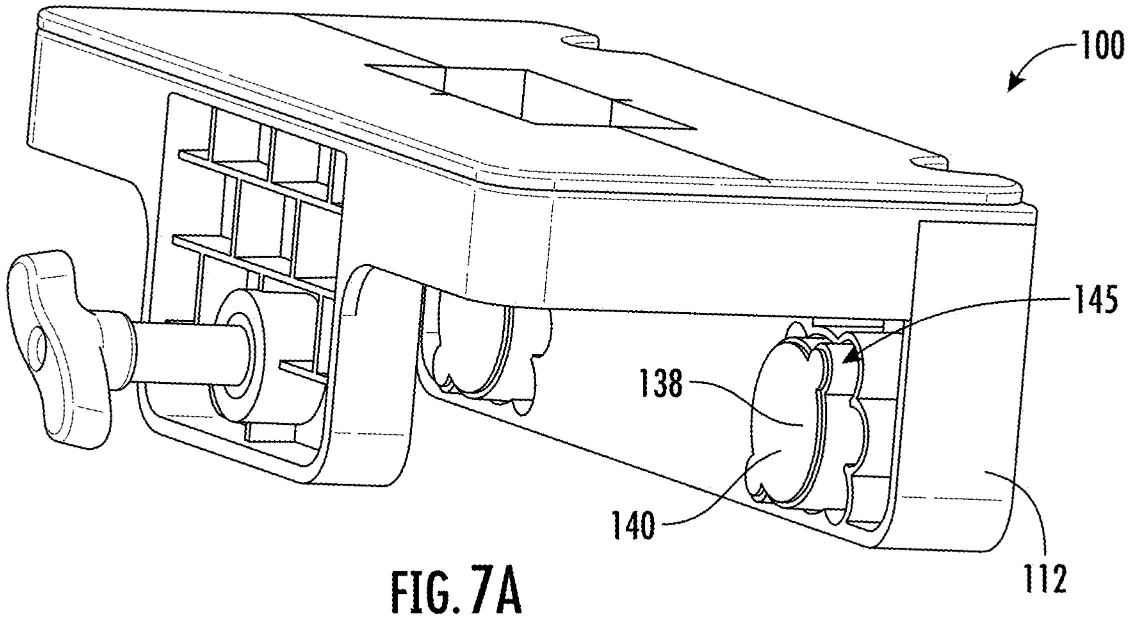
FIG. 7A is another isometric view of the router guide jig of FIG. 1 with the backset in a third position and third angular orientation.
Figure 7B:
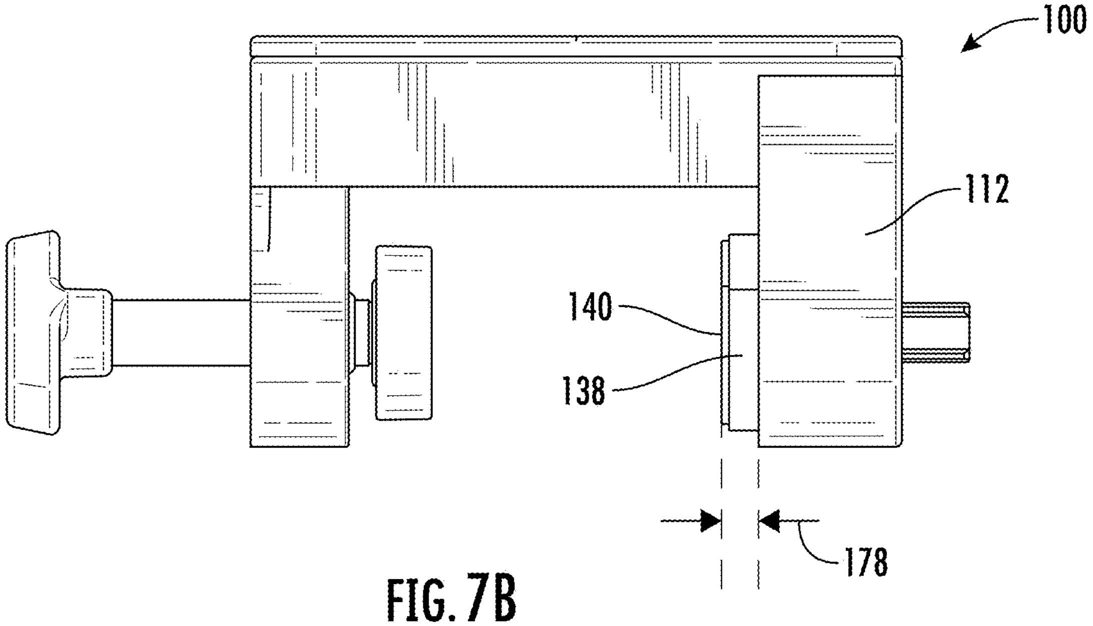
FIG. 7B is a vertical cross section of the router guide jig of FIG. 7A.

The first leg 112 has a third backset positioning abutment 176 against which the back seat member 138 abuts in a third position 145 (FIG. 7A, FIG. 7B). As seen in FIG. 19, The first, second and third backset positioning abutments 172, 174,176 are offset from one another. The third distance 178 (FIG. 7B) is the distance between the abutment surface 140 and the first leg 112 when the backset member 138 is positioned in a third orientation as discussed below with respect to FIGS. 7A, 7B and in the third position 145.

The backset member 138 is mountable to the first leg 112 in a first angular orientation about a mounting axis 180 that is generally perpendicular to axis 120 in the first position 141 (FIG. 5A) of the backset member 138. In the first angular orientation the abutment portion 182 (FIG. 3) of the backset member 138 abuts the first backset positioning abutment 172 (FIG. 19). The first backset member 138 is also mountable to the first leg 112 in a second angular orientation about the mounting axis 180 in the second position 143 (FIGS. 6A, 6B) such that the abutment portion 182 (FIG. 3) of the back set member 138 abuts the second backset positioning abutment 174 (FIG. 19).

The backset member 138 is also mountable to the first leg 112 in a third angular orientation about the mounting axis 180 in a third position 145 (FIGS. 7A, 7B) such that the abutment portion 182 (FIG. 3) of the backset member 138 abuts the third backset positioning abutment 176 (FIG. 19).

As seen in FIG. 3, the backset member 138 includes a positioning lobe 184 that may be a pair of offset positioning lobes 184, 185 that provides the abutment portion 182. The first backset positioning surface 172 is the bottom of a first backset member lobe receiving notch 186. The positioning lobe 184 is received in the first backset member lobe receiving notch 186 in the first position (FIG. 5A). Interaction of the first backset member lobe receiving notch 186 and the first positioning lobe 184 prevents angular rotation of the backset member 138 when in the first position (FIG. 5A).

The second backset positioning surface 174 is the bottom of a second backset member lobe receiving notch 188. The second backset member lobe receiving notch 188 is angularly offset from the first backset member lobe receiving notch 186 about the mounting axis 180. The positioning lobe 184 is received in the second backset member lobe receiving notch 188 in the second position 143 (FIG. 6A). Interaction of the second backset member lobe receiving notch 188 and the positioning lobe 184 prevent angular rotation of the backset member 138 when in the second position 143. The third backset positioning surface 176 is the bottom of a third backset lobe receiving notch 190. The positioning lobe 184 is received into the third backset member receiving notch 190 in the third position 145 (FIG. 7A). Interaction of the third backset member lobe receiving notch 190 and the positioning lobe 184 prevent angular rotation of the backset member 138 when in the third position 145.

FIGS. 5A, 5B illustrate the router guide jig 100 with the backset member 138 in the first position 141. The abutment surface 140 faces the second leg 114. The abutment surface 146 of the clamp member 104 faces the first leg 112. The abutment surface 140 and the abutment surface 146 of the clamp member 104 form a workpiece clamping gap 192 therebetween for receipt of a workpiece 102 (FIG. 1) such that the abutment surface 140 and the abutment surface 146 of the clamp member 104 can be clamped against opposed sides of the workpiece 102 as seen in FIG. 1.

Figure 8:
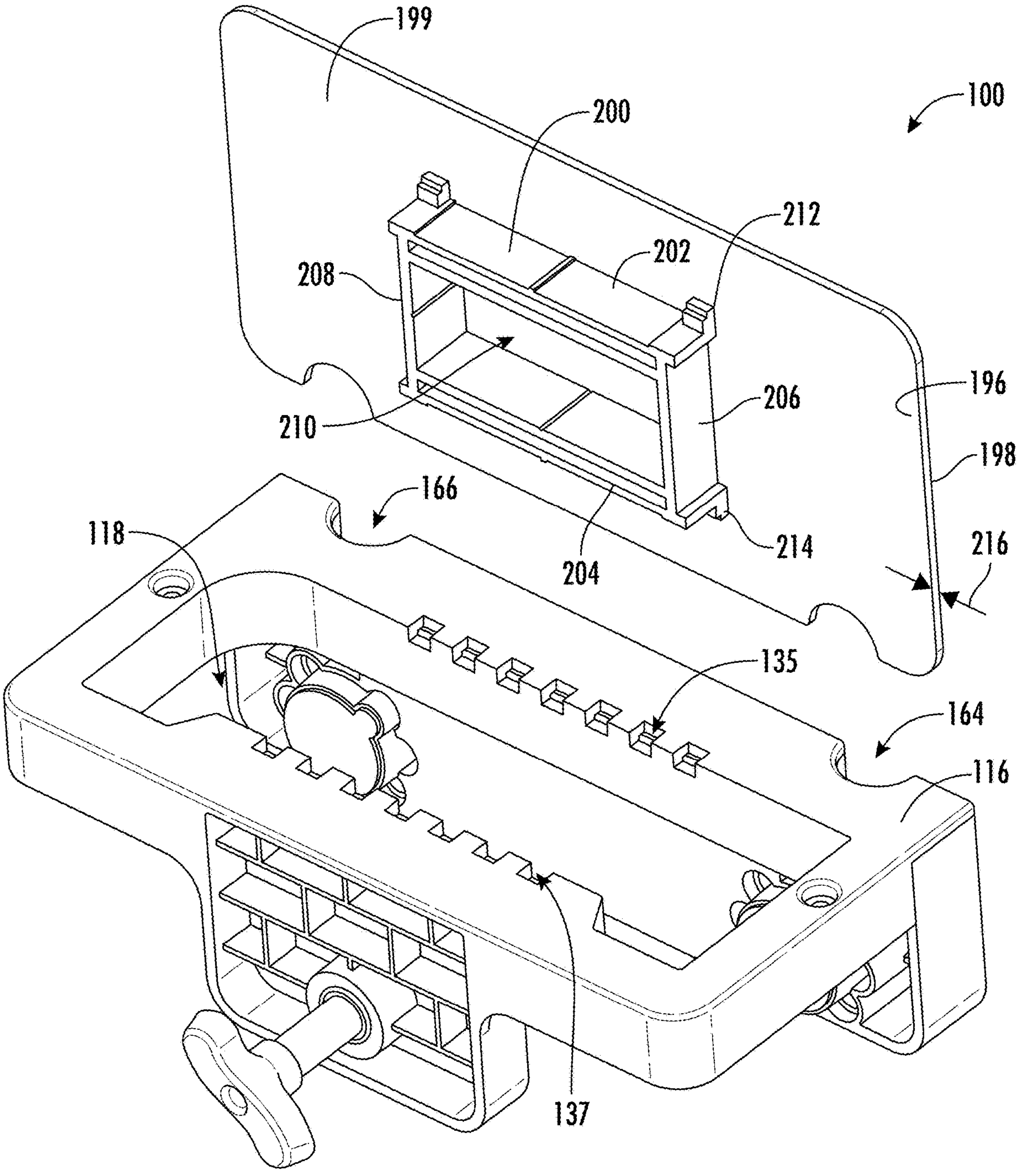
FIG. 8 is another isometric view of the router jig of FIG. 1 but with a template shown in an assembly view.

FIG. 8 illustrates the router guide jig 100 with the divider block 126 (FIG. 1) removed to permit the template 194 to be received in the receiving opening 118 of the support member 116. The template 194 includes a pair of opposed sides 196, 198. One of the sides 196 that abuts the support member 118 when mounted thereto, includes a mounting structure 200 that may be a rectangular box defined by four walls 202, 204, 206, 208 that protrude away from the opposed side 196. The mounting structure 200 defines an aperture 210 that is rectangular and a through hole extending through the opposed sides 196, 198 and the mounting structure 200. The mounting structure 200 is receivable into the receiving opening 118 such that a router bit 150 (FIG. 3) can pass through the aperture 210 to act as a guide for routing the mortise of a workpiece 102 (FIG. 1).

The mounting structure 200 that is the rectangular box includes the pair of opposing walls 206, 208. Each opposing wall 206, 208 includes a pair of mounting ears 212, 214 that are in the same stepped profile as the mounting ears 152, 154 (FIG. 3) and may be understood as protrusions, protruding away from the mounting structure 200. The stepped profile provides for reception of the pair of mounting ears 212, 214 in the mounting recesses 135,137 which are shaped to cooperate with the stepped profile of the mounting ears 212, 214.

With the reception of the template 194 in the support member 116, the depth notches 164, 166 increase in depth in an amount equal to a thickness 216 of the template 194 such that the router bit 150 (FIG. 3) can be set just as previously described without a user having to calculate the additional thickness 216 of the template 194 to determine the proper router bit 150 (FIG. 3) depth. Moreover, other templates may be inserted in the receiving opening 118 having various sizes. For example, a template may be sized for the routing of a mortise for a latch 1⅛'×2¾ inch, yet another template may be inserted having one area sized for a latch 1⅛ inches×3¼ inches and another area spaced apart from the one area and sized for routing a latch 1 inch×3¼ inches.

Figure 9:
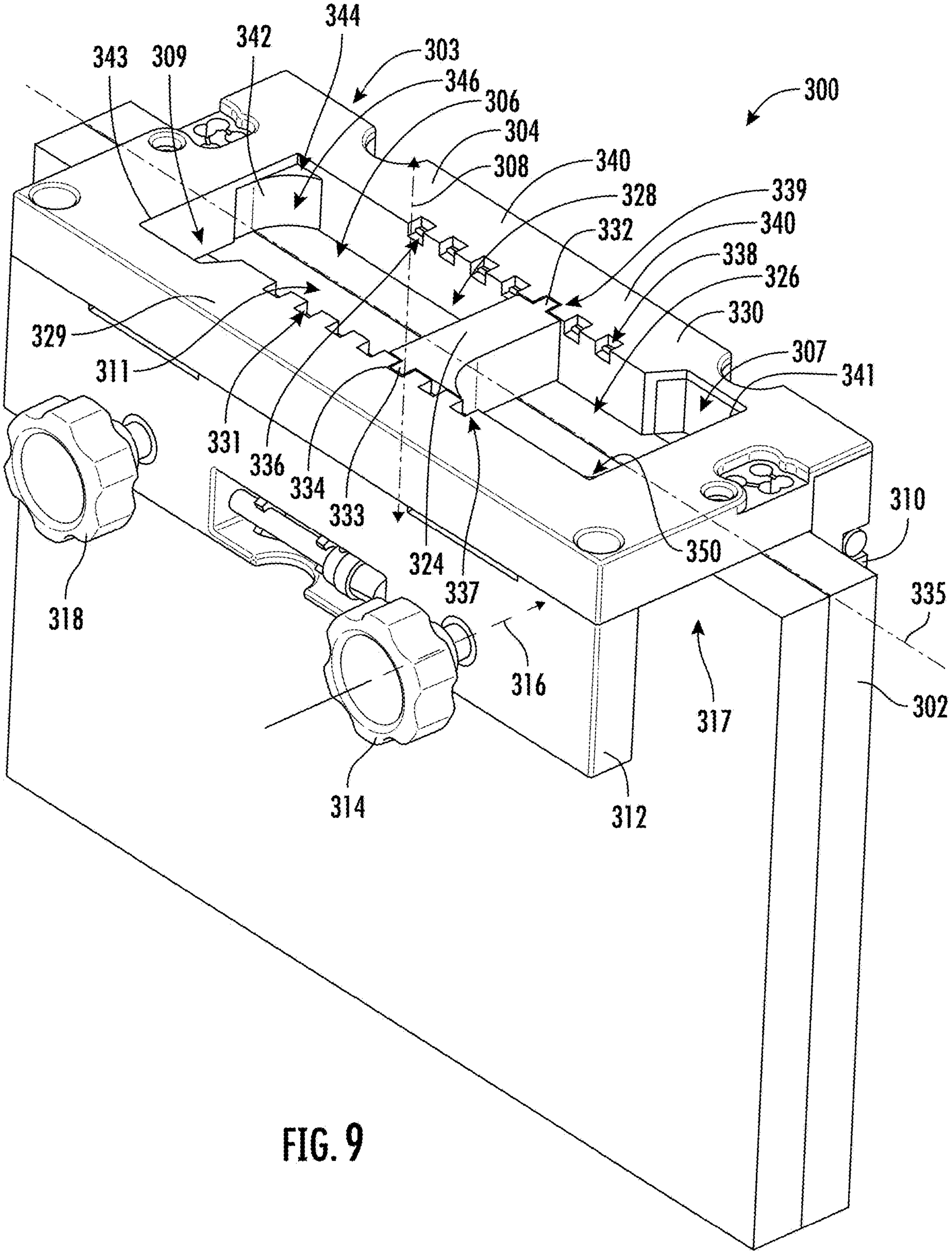
FIG. 9 illustrates an isometric view of a second embodiment of a router guide jig in a first configuration and clamped to a workpiece.

Turning now to FIG. 9, a second embodiment of a router guide jig 300 is illustrated clamped to a work piece 302 in a first configuration. The router guide jig 300 includes a frame assembly 303 that includes a support member 304. The support member 304 has a receiving opening 306 extending through the support member 304 defining an axis 308. The receiving opening 306 permits a router bit to be extended therethrough. The receiving opening 306 also includes opposed router starter regions 307, 309 that are on opposite sides 329, 330 of the support member 304. A first leg 310 of the frame assembly 303 extends downward from the support member 304 and is offset, at least in part, from the receiving opening 306.

Figure 12:
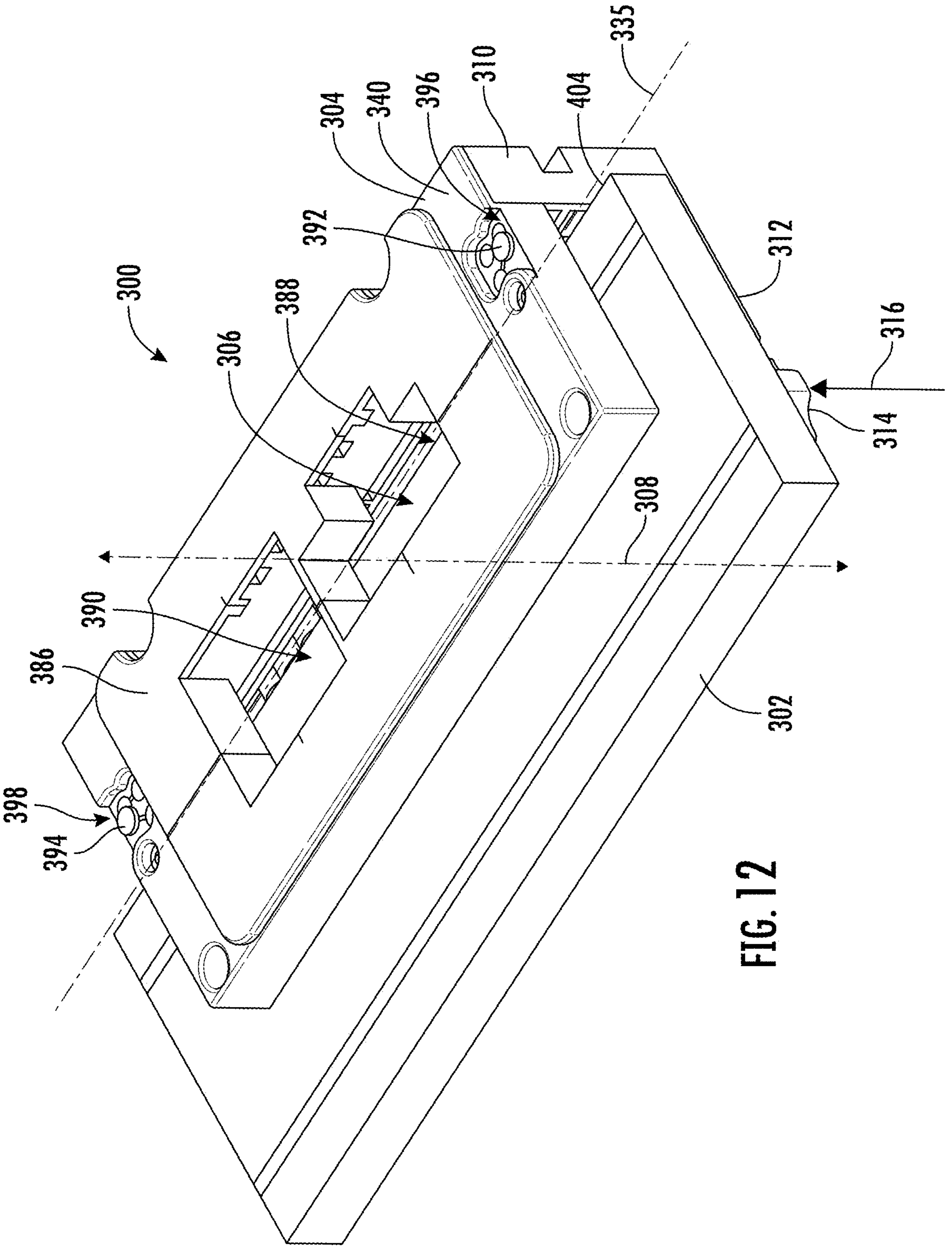
FIG. 12 illustrates the router guide jig of FIG. 9 in a second configuration and with a clamped workpiece.

The frame assembly 303 includes a second leg 312 carrying at least one clamp 314 with a clamp abutment surface 315 (FIG. 17) facing away from the second leg 312. As will be discussed below, the second leg 312 can be detached from the support member 304 and attachable to the first leg 310 so as to permit a second configuration of the router guide jig 300 (FIG. 12). Accordingly, because of this feature the router guide jig 300 is a modular router guide jig. The at least one clamp member 314 is adjustable relative to the second leg 312 to adjust a clamping force 316 provided by the at least one clamp member 314.

The second leg 312 is mounted in a first configuration to the support member 304 in a downward extending orientation. In the first configuration the second leg 312 is spaced apart from the first leg 310 such that a gap 317 is created between the second leg 312 and the first leg 310. In FIG. 9, the workpiece 302 is inserted in the gap 317. In the first configuration, a portion of the receiving opening 306 is positioned between the first leg 310 and the second leg 312.

In the first configuration the clamp abutment surface 315 (FIG. 11) faces the first leg 310 such that the workpiece 302 is clamped between the first leg 310 and the second leg 312. In the first configuration the clamping force 316 is provided by the clamp member 314 and is generally perpendicular to the axis 308. As illustrated, a second clamp member 318, is parallel to and spaced away from the first clamp member 316. The second clamp member 318 may be carried by the second leg 312 and functions the same as the first clamp member 314.

The receiving opening 306 defines a region 311 having cross sectional area within the support member 304. A divider block 324 may be removably fixed within the region 311 to divide the receiving opening 306 into two regions 326, 328 each defining their own cross-sectional areas.

The divider block 324 has divider mounting features 332, 334 having stepped profiles. The mounting features 332, 334 are projections from the divider block 324.

The support member 304 includes a mounting feature 336 that is a mounting recess having a stepped profile. The support member 304 also includes a mounting feature 338 that is a mounting recess having a stepped profile and is spaced away from mounting feature 336 in a direction along a longitudinal axis 335 passing through support member 304. The support member 304 may also have mounting feature 339 that is also a mounting recess having a stepped profile and located between mounting feature 336 and 338. Indeed, as illustrated there may be a plurality of mounting features between mounting features 336, 338, 339 with each located on the same side 330 of the support member 304 and in a top surface 340 of the support member 304. Also, each mounting feature 336, 338, 339 may have a parallel complimentary mounting feature 331, 333, 337 at the side 329 of the support member 304. The mounting features 336, 338, 339 and complimentary mounting features 331, 333, 337 are each shaped to receive divider mounting features 332, 334 to provide for at least three different mounting positions for the divider block 324 in the receiving opening 306.

Accordingly, the divider mounting feature 332 is receivable in the mounting feature 336 located on the side 330 of the support member 304 and is receivable in mounting feature 336 or 338 or one of the plurality of mounting features 339 therebetween. When the first mounting feature 332 of the divider block 324 is mounted to the mounting feature 339, the first region 326 has a first cross-sectional area and the second region 328 has a second cross-sectional area.

When the divider mounting feature 332 of the divider block 324 is mounted to the mounting feature 338, the region 328 has a third cross-sectional area larger than the first cross-sectional area and the region 326 has a fourth cross-sectional area smaller than the second cross-sectional area.

Thus, the divider block 324 is adjustably positionable within the receiving opening 306 to adjust the spacing and thus the cross sectional areas 326, 328 between the divider block 324 and a first side 341 and the second side 343 defining the receiving opening 306.

An insert 342 may be removably inserted into the receiving opening 306 to abut adjoining sides forming a square corner 344 in the receiving opening 306. The insert 342 may be radiused to provide a corner 346 that has a radius of curvature that is greater than the radius of curvature of the square corner. Thus, the insert 342 permits use with round hardware, for example, hinges, latch plates, and strike plates. Another insert 348 (FIG. 11), that is shaped as insert 342 may be inserted in another corner 350 of the receiving opening 306 to provide another radiused corner and thereby provide further modification of the receiving opening 306 with or without the divider block 324 inserted for guiding a router in routing hardware such as hinges, latch plates, and strike plates.

Figure 10:
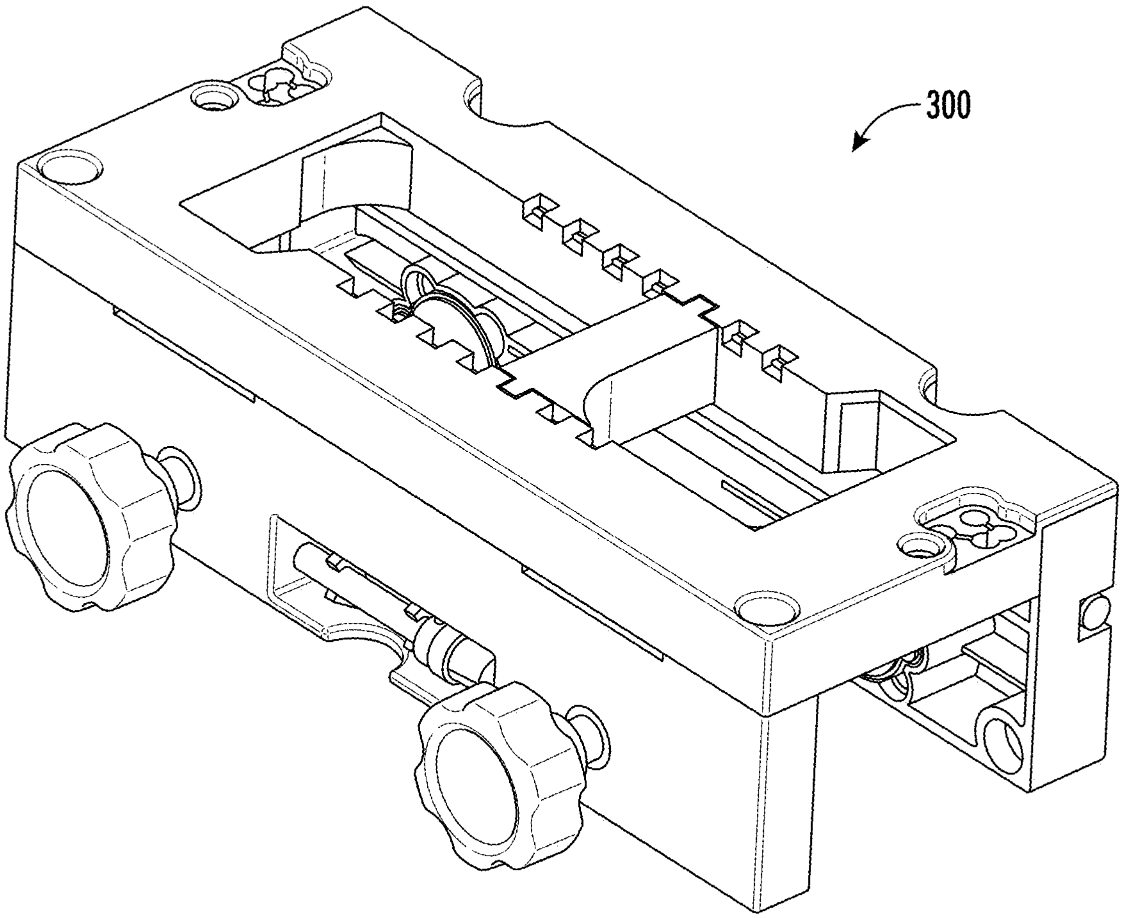
FIG. 10 illustrates the router guide jig of FIG. 9 in the first configuration with the workpiece removed.

FIG. 10 illustrates the router guide jig 300 in the first configuration and with the workpiece 302 (FIG. 1) removed.

Figure 11:
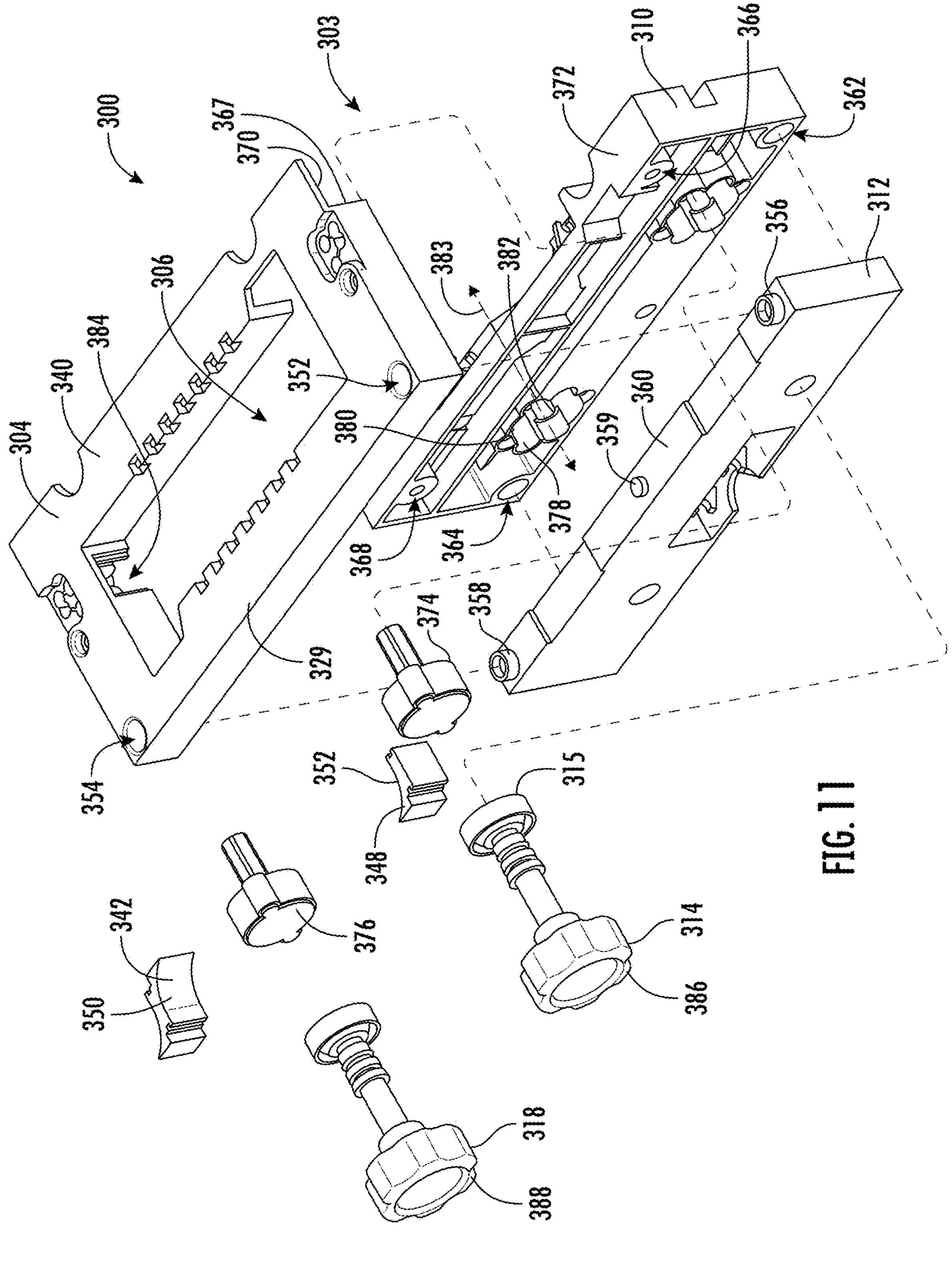
FIG. 11 illustrates an exploded view of the router guide jig of FIG. 10.

FIG. 11 illustrates an exploded view of the router guide jig 300. The frame assembly 303 includes the support member 304. The support member has mounting apertures 352, 354 axially spaced on the same side 329 of the support member 304. The mounting apertures 352, 354 receive, respectively, complimentary alignment bosses 356, 358 protruding from a top side 360 of the second leg 312 of the frame assembly 303. Fasteners, for example screws inserted through the apertures 352, 354 and the alignment bosses 356, 358 removably fix the support member 304 to the second leg 312. The same alignment bosses 356, 358 can also be received in mounting apertures 362, 364 of the first leg 310 in a second configuration of the router guide jig 300 that may be removably fixed with fasteners. A further alignment member 359 may also assist in mounting the second leg 312.

The first leg 310 includes axially spaced mounting apertures 366, 368 that mate with axially spaced mounting apertures (not illustrated) on a back side 367 of the support member 304 so as to be able to receive fasteners therethrough to removably fix the first leg 310 to the support member 304. A shelf 370 forming part of the top surface 340 also provides support for the support member 304 as it is received on a top bearing surface 372 of the first leg 310.

Router guide jig 300 includes backset members 374, 376 carried by the second leg 312. Backset positioning abutments 378, 380, 382 are located in the second leg 312 axially and angularly offset from one another relative to axis 383. The backset members 374, 376 and the backset positioning abutments 378, 380, 382 cooperate together, function, and are structurally similar to backset members 138, 139 (FIG. 3) and back set positioning abutments 172, 174, 176, (FIG. 19) as previously describe above with respect to router guide jig 100.

Router guide jig 300 includes inserts 342, 348 that include radiused sides 350, 352 respectfully. The support member includes notches 384 that may receive one of the inserts 342, 348 so as to provide a radiused corner within the recess opening 306. Clamp members 314, 318 function and are structured as previously described with respect to clamp member 104 (FIG. 1) except, as illustrated the handles 386, 388 are circular and contoured for ease of angular rotation but as readily understood other handle geometries are within the teachings of the invention.

FIG. 12 illustrates the router guide jig 300 in a second configuration with the clamped workpiece 302 positioned for being routed. The first and second configurations permit router guide jig 300 to be used to guide routers to route mortises in doors, door frames and jambs.

In the second configuration, the second leg 312 is mountable to the first leg 310 and the second leg 312 is spaced apart from the support member 304. A template 386 is shown inserted in the receiving opening 306 to provide regions 388, 390 for insertion of a router to router the mortises in a door frame for different sized strike plates. The template 386 includes a mounting feature that is similar to the mounting structure 200 (FIG. 8) of template 194 (FIG. 8) and therefore will not be further described.

In the first configuration of the router guide jig 300 (FIG. 9) the clamping force 316 is generally perpendicular to the axis 308 defined by the receiving opening 306. In the second configuration as illustrated in FIG. 12, the clamping force 316 provided by the clamp 314 is generally parallel to the axis 308. Axis 308 extends in a direction perpendicular to the longitudinal axis 335 defined by the receiving opening 306. Axis 308 extends in a direction perpendicular the plane defined by top surface 340 of the support member 304.

In order to align an edge 404 of the workpiece relative to the receiving opening 306, router guide jig 300 includes workpiece locating pins 392, 394 that are axially spaced apart. The support member 304 has a pair of apertured regions 396, 398 to provide mounting positions for the workpiece locating pins 392, 394 so as to correctly position the receiving opening 306 on the workpiece 302 as further discussed below with respect to FIG. 15.

Figure 13:
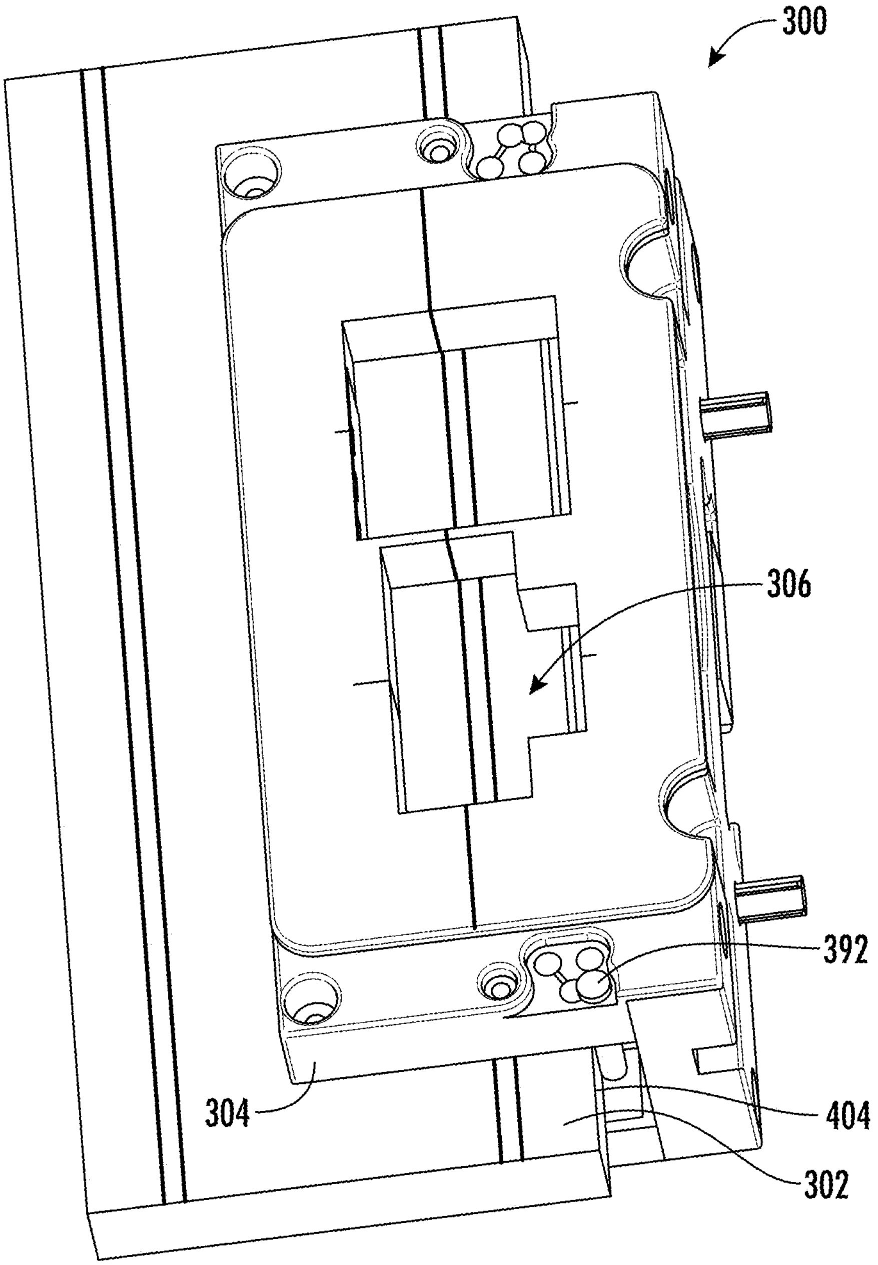
FIG. 13 illustrates another isometric view of the router guide jig of FIG. 12.
Figure 14:
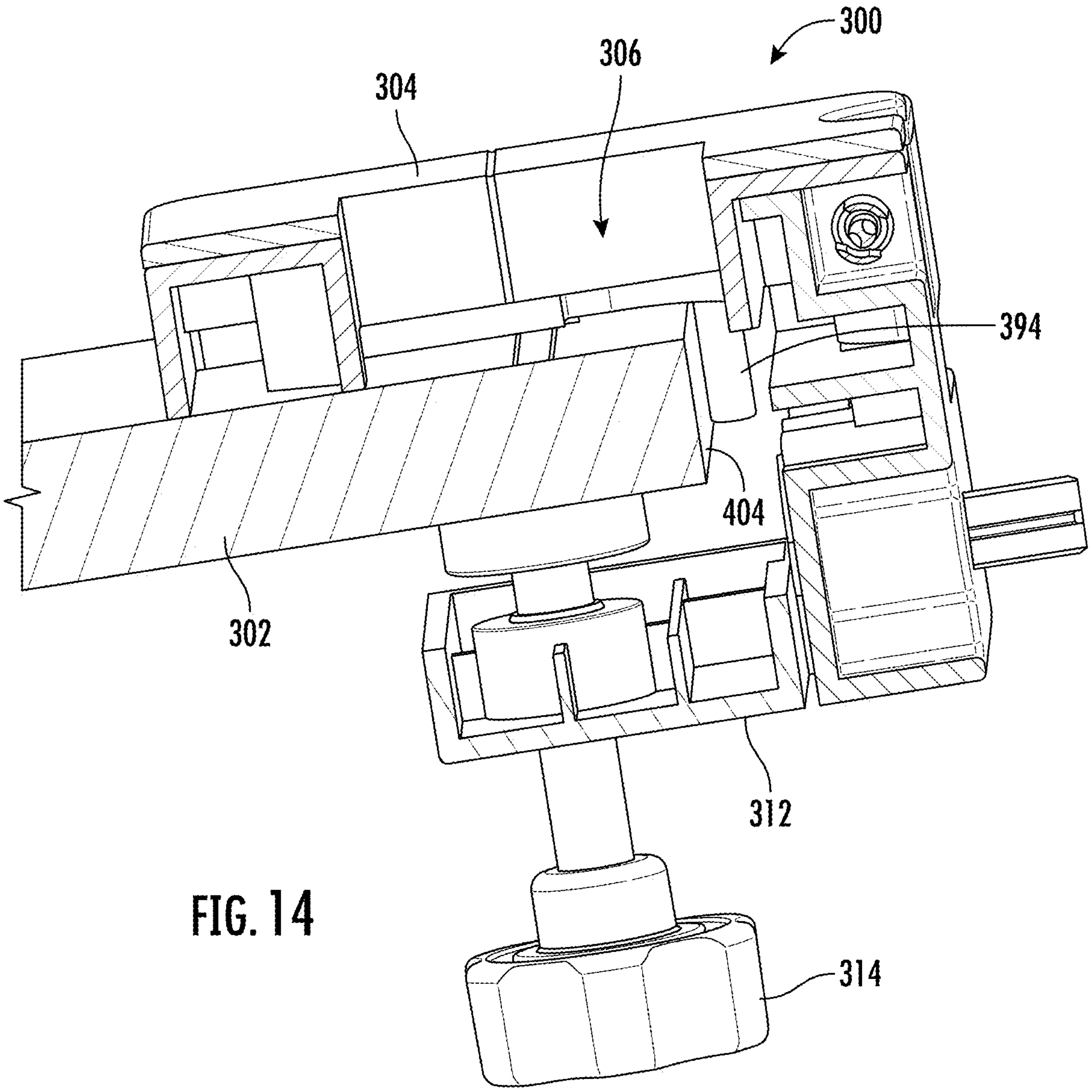
FIG. 14 illustrates a cross sectional view of the router guide jig of FIG. 12.

FIG. 13 illustrates a top and right side view of the router guide jig 300 while FIG. 14 illustrates a cross section of the router guide jig to better illustrate the workpiece locating pins 392 (FIG. 13), 394 (FIG. 14) and their abutment with the edge 404 of workpiece 302 to provide the correct alignment of the receiving opening 306 on the workpiece 302. The clamp abutment surface 315 (FIG. 16) of the clamp 314 faces the support member 304 in the second configuration such that the workpiece 302 is clamped between the second leg 312 and the support member 304.

Figure 15:
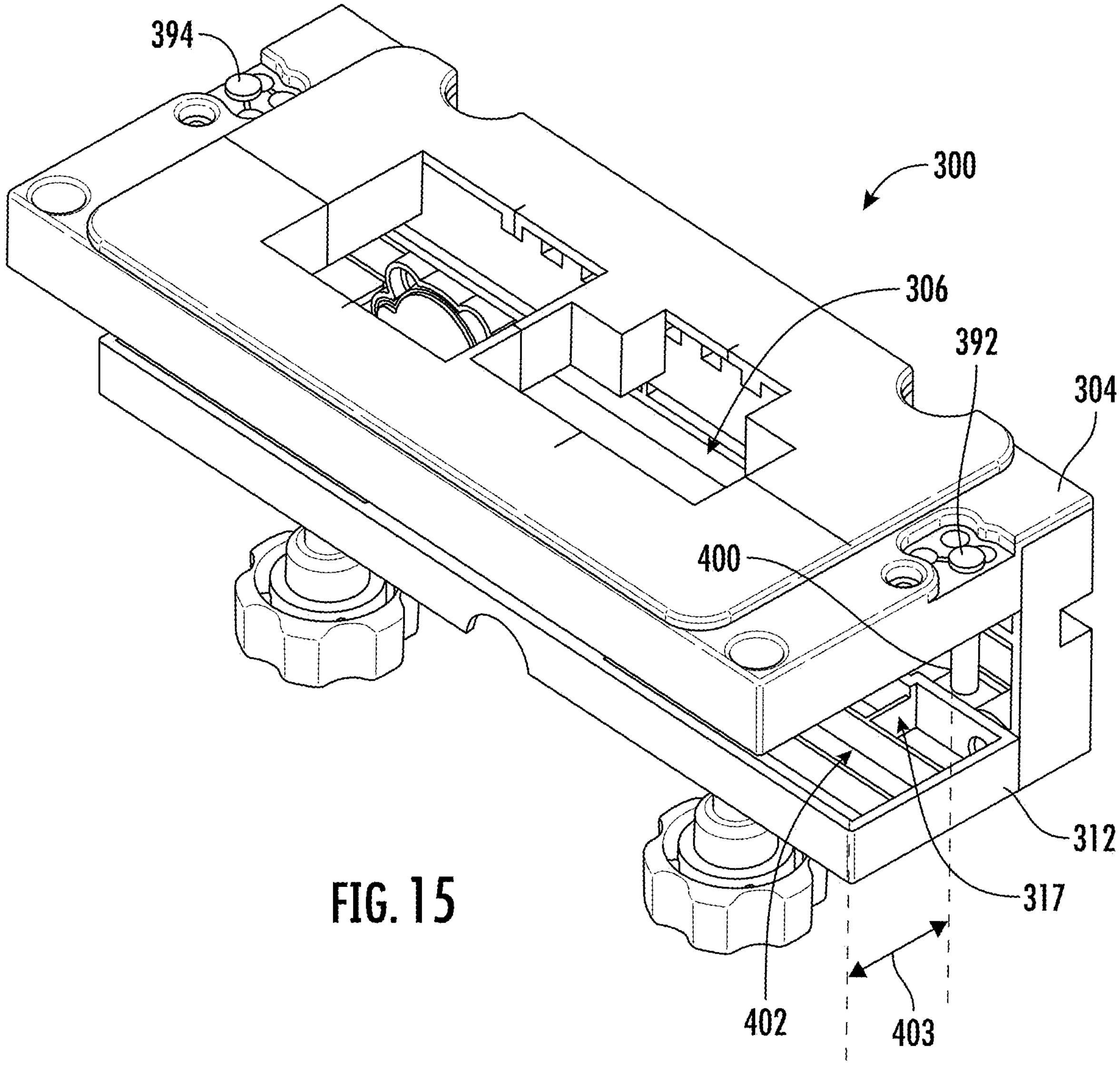
FIG. 15 illustrates another isometric view of the router guide jig of FIG. 12 without the clamped workpiece.

FIG. 15 illustrates the router guide jig 300 without the workpiece 302 (FIG. 12) clamped therein. The workpiece locating pins 392, 394 removably mount to either the second leg 312 or the support member 304. The workpiece locating pins 392, 394 define a bottom 400 of a gap 402 formed between the support member 304 and the second leg 312 when in the second configuration. Without the workpiece locating pins 392, 394, backset members 374, 376 (FIG. 17) may provide the bottom 400 that is also adjustable to align the edge 404 (FIG. 12) so as to position the receiving opening 306 relative to the edge 404 (FIG. 12) to be routed.

The workpiece locating pins 392, 394 can be located in a plurality of different locations to adjust a depth 403 of the gap 317 formed between the support member 304 and the second leg 312 so as to position the receiving opening 306 relative to an edge 404 (FIG. 13) of the workpiece 302 when the edge 404 (FIG. 13) is abutted against the workpiece 302 (FIG. 13) when the router guide jig 300 is in the second configuration.

Figure 16:
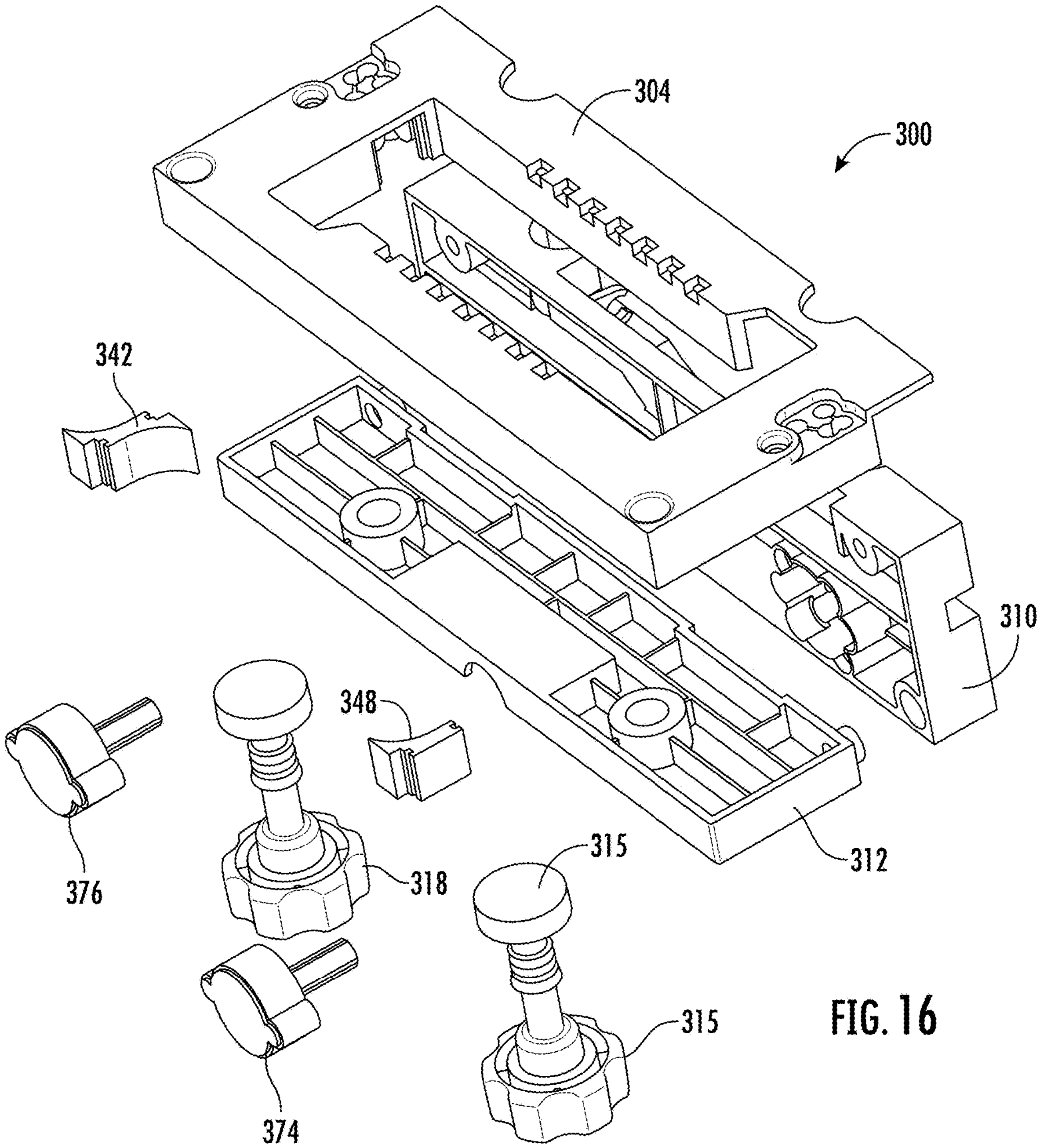
FIG. 16 illustrates an exploded view of the router guide jig of FIG. 12.

FIG. 16 illustrates an exploded view of the router guide jig 300 which includes the support member 304, first leg 310, second leg 312, clamp 314 with abutment face 315 facing support member 304, clamp 318, inserts 342, 348, and backset members 374, 376.

Figure 17:
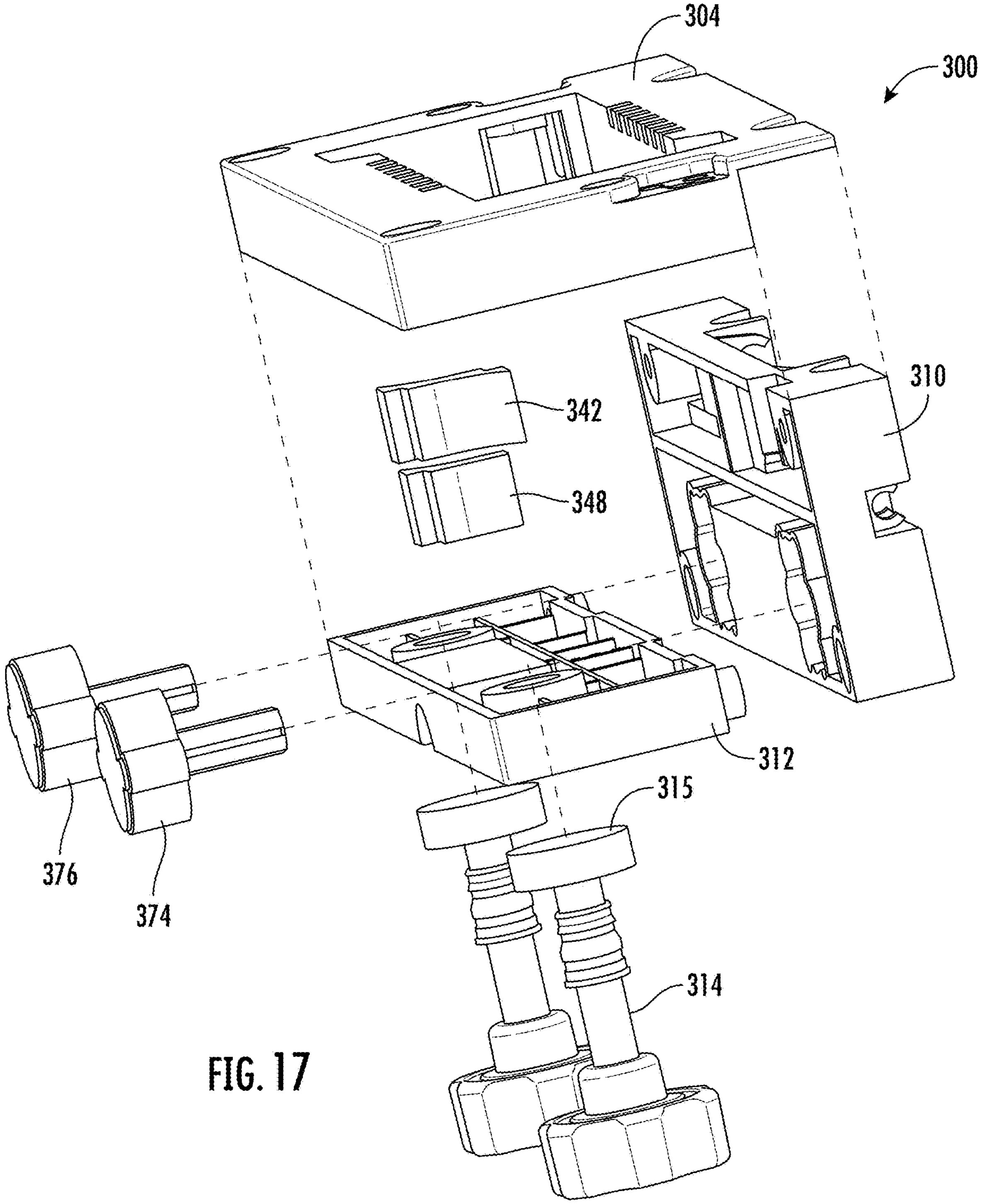
FIG. 17 illustrates another exploded view of the router guide jig of FIG. 12.

FIG. 17 illustrates another exploded view of the router guide jig 300 but with axial alignment of the support member 304, first leg 310, second leg 312, clamp 314 with abutment face 315 facing support member 304, clamp 318, inserts 342, 344, and backset members 374, 376.

Figure 18:
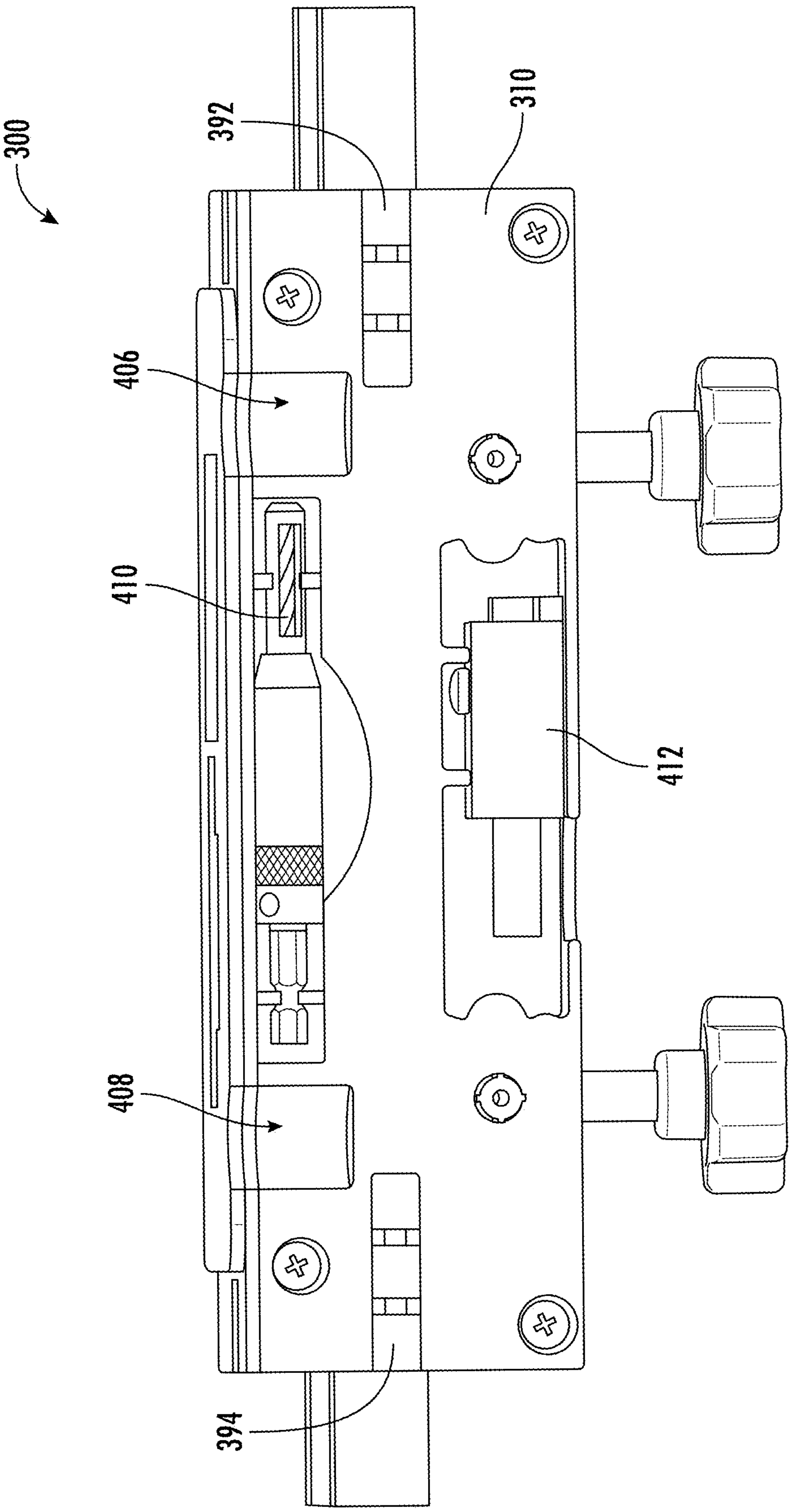
FIG. 18 illustrates a rear view of the router guide jig of FIG. 12.

FIG. 18 illustrates a rear view of the router guide jig 300 having depth notches 406, 408 and showing the first leg 310 carrying the drill bit 410, corner chisel 412 and the workpiece locating pins 392, 394. The router bit (not illustrated) is carried by the second leg 312 (FIG. 17).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A router guide jig comprising:

a frame assembly comprising:

a first leg;

a second leg;

a support member having a receiving opening extending through the support member positioned at least in part offset from the first leg, the receiving opening defining a first axis;

at least one backset member carried by the first leg having a first abutment surface facing away from the first leg, the at least one backset member positionable in at least a first position and in a second position relative to the first leg, wherein:

in the first position, the first abutment surface is spaced a first distance from the first leg; and in a second position, the first abutment surface is spaced a second distance from the first leg;

at least one clamp member carried by the second leg having a second abutment surface facing away from the second leg, the at least one clamp member adjustable relative to the second leg to adjust a clamping force provided by the at least one clamp member;

wherein the first leg has a first backset positioning abutment against which the first backset member abuts in the first position and a second backset positioning abutment against which the first back set member abuts in the second position, the first and second backset positioning abutments being offset from one another a difference between the first and second distances;

wherein the first backset member is mounted to the first leg in a first angular orientation about a second axis generally perpendicular to the first axis in the first position such that an abutment portion of the first backset member abuts the first backset positioning abutment and the first backset member is mounted to the first leg in a second angular orientation about the second axis in the second position such that the abutment portion of the first back set member abuts the second backset positioning abutment.

2. The router jig of claim 1, wherein the first and second legs are mounted to the support member such that the receiving opening is positioned, at least in part, between the first and second legs.

3. The router jig of claim 2, wherein the first abutment surface faces the second leg and the second abutment surface faces the first leg, the first and second abutment surfaces forming a workpiece clamping gap therebetween for receipt of a workpiece such that the first and second abutment surfaces can be clamped against opposed sides of the workpiece.

4. The router jig of claim 1, wherein:

the first backset member includes a first positioning lobe that provides the abutment portion;

the first backset positioning surface is the bottom of a first backset member lobe receiving notch, the first positioning lobe received in the first backset member lobe receiving notch in the first position, interaction of the first backset member lobe receiving notch and the first positioning lobe preventing angular rotation of the first backset member when in the first position; and the second backset positioning surface is the bottom of a second backset member lobe receiving notch angularly offset from the first backset member lobe receiving notch about the second axis, the first positioning lobe received in the second backset member lobe receiving notch in the second position, interaction of the second backset member lobe receiving notch and the first positioning lobe preventing angular rotation of the backset member when in the second position.

5. The routing guide jig of claim 1, wherein the second backset member is carried by the first leg, the first backset member spaced apart from the second backset member.

6. A router guide jig comprising:

at least one clamp member having a clamp abutment surface;

a frame assembly comprising:

a support member having a receiving opening extending through the support member defining a first axis;

a first leg extending downward from the support member and offset at least in part from the receiving opening;

a second leg carrying the at least one clamp with the clamp abutment surface facing away from the second leg, the at least one clamp member adjustable relative to the second leg to adjust a clamping force provided by the at least one clamp member, the second leg being mountable:

in a first configuration to the support member in a downward extending orientation, the second leg being spaced apart from the first leg in the first configuration for a first gap therebetween, with a portion of the receiving opening positioned between the first and second legs, the clamp abutment surface facing the first leg in the first configuration such that a workpiece is clamped between the first and second legs; and in a second configuration to the first leg, the second leg being spaced apart from the support member in the second configuration, the clamp abutment surface facing the support member in the second configuration such that a workpiece is clamped between the second leg and the support member.

7. The router guide jig of claim 6, wherein the first leg carries at least one backset member and clamping occurs between the at least one clamp and the backset member in the first configuration.

8. The router guide jig of claim 7, further comprising a pair of workpiece locating pins removably mounted to either the second leg or the support member, the workpiece locating pins defining a bottom of a gap formed between the support member and the second leg when in the second configuration.

9. The router guide jig of claim 8, wherein the workpiece locating pins can be located in a plurality of different locations to adjust a depth of the gap formed between the support member and the second leg so as to adjust a position of the receiving opening relative to an edge of a workpiece when the edge is abutted against the workpiece when in the second configuration.

10. The router guide jig of claim 6, wherein the receiving opening defines a first axis and wherein in the first configuration the clamping force provided by the at least one clamp is perpendicular to the first axis, and wherein in the second configuration the clamping force is parallel to the first axis.

11. A method comprising:

configuring the router guide jig of claim 6 in the first configuration and forming a first mortice in an edge of a door;

configuring the router guide jig in the second configuration and forming a second mortice in a side of a door jamb or door frame.

12. The method of claim 11, further comprising:

when in the first configuration, clamping the door between the clamp and the first leg;

when in the second configuration, clamping the jamb or frame between the clamp and the support member.

13. A router guide jig comprising:

a frame assembly comprising a support member having a receiving opening extending through the support member defining a first axis, the frame assembly defining a top support surface, the support member including at least first and second mounting features being axially spaced apart;

a divider mountable to the mounting features of the frame assembly with the divider being within the receiving opening, the divider dividing the receiving opening into at least a first region and a second region, the divider having a first divider mounting feature, when the first divider mounting feature of the divider is mounted to the first mounting feature, the first region has a first cross-sectional area and the second region has a second cross-sectional area, when the divider mounting feature of the divider is mounted to the second mounting feature, the first region has a third cross-sectional area larger than the first cross-sectional area and the second region has a fourth cross-sectional area smaller than the second cross-sectional area; and a template defining a template opening therethrough defining a template axis, the template removably mountable to the top support surface with the template axis parallel to the first axis and the receiving opening in communication with template opening, the template including first and second template mounting features that engage the first and second mounting features of the support member when the template is mounted to the support member and the divider is removed from the support member.

14. The router guide jig of claim 13, wherein the mounting features are recesses provided by the support member and projections provided by the divider and the template.

15. The router guide jig of claim 13, wherein there is a third mounting feature provided by the support member, the third mounting feature being provided between the first and second mounting features.

16. The router guide jig of claim 13, wherein the mounting features of the divider and template have a stepped profile.

17. A router guide jig comprising:

a frame assembly comprising a support member having a receiving opening extending through the support member defining a first axis, the receiving opening being generally rectangular having a first side, a second side and a third side extending perpendicular to and between the first and second sides defining a first corner with the first side and a second corner with the second side, the first corner having a radius of curvature that is smaller than a radius of curvature of the second corner;

wherein the first corner is substantially a square corner;

further comprising a divider mountable within the receiving opening, a first side of the divider forming a third corner with the third side, the third corner being a radiused corner having a radius of curvature equal to the second radius of curvature;

a second side of the divider forming a further corner with the third side, the fourth corner being a square corner having a radius of curvature equal to the first radius of curvature; and wherein the first and second corners are permanently formed by the support member and the radiused portion of the third corner is provided by the divider.

18. The router guide of claim 17, wherein the divider is adjustably positionable within the receiving opening to adjust a spacing between the divider and the first side and the second side defining the receiving opening.

19. A method comprising:

configuring the router guide jig of claim 6 in a first configuration with the backset member in the first position and forming a first mortice in an edge of a first door having a first thickness;

configuring the router guide jig in a second configuration with the backset member in the second position and forming a second mortice in an edge of a second door having a second thickness different than the first thickness.

* * * * *